US010841938B2

(12) United States Patent
Takeda et al.

(10) Patent No.: US 10,841,938 B2
(45) Date of Patent: Nov. 17, 2020

(54) USER TERMINAL AND RADIO COMMUNICATION METHOD TO ACHIEVE A SATISFACTORY LATENCY-REDUCING EFFECT WHEN MULTIPLE TTIS OF DIFFERENT TIME DURATIONS ARE USED IN THE SAME CARRIER

(71) Applicant: NTT DOCOMO, INC., Tokyo (JP)

(72) Inventors: Kazuki Takeda, Tokyo (JP); Shinpei Yasukawa, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/300,399

(22) PCT Filed: May 9, 2017

(86) PCT No.: PCT/JP2017/017447
§ 371 (c)(1),
(2) Date: Nov. 9, 2018

(87) PCT Pub. No.: WO2017/195748
PCT Pub. Date: Nov. 16, 2017

(65) Prior Publication Data
US 2019/0230695 A1    Jul. 25, 2019

(30) Foreign Application Priority Data

May 10, 2016   (JP) ................. 2016-094760

(51) Int. Cl.
*H04W 72/12*     (2009.01)
*H04W 72/04*     (2009.01)
*H04W 28/06*     (2009.01)

(52) U.S. Cl.
CPC ....... *H04W 72/1278* (2013.01); *H04W 28/06* (2013.01); *H04W 72/04* (2013.01); *H04W 72/12* (2013.01)

(58) Field of Classification Search
CPC . H04W 72/1278; H04W 72/12; H04W 72/04; H04W 72/1289; H04W 72/1294; H04W 72/14; H04W 28/06
See application file for complete search history.

(56) References Cited

U.S. PATENT DOCUMENTS

2015/0334729 A1    11/2015   Ji et al.

OTHER PUBLICATIONS

International Search Report issued in PCT/JP2017/017447 dated Jul. 25, 2017 (2 pages).
Written Opinion of the International Searching Authority issued in PCT/JP2017/017447 dated Jul. 25, 2017 (5 pages).

(Continued)

*Primary Examiner* — Ian N Moore
*Assistant Examiner* — Brian T Le
(74) *Attorney, Agent, or Firm* — Osha Bergman Watanabe & Burton LLP

(57)   ABSTRACT

A satisfactory latency-reducing effect is achieved when a plurality of transmission time intervals (TTI) of varying time durations are used in the same carrier. In this regard, a user terminal has a receiving section that receives scheduling information pertaining to a second TTI, which is shorter than a first TTI. The user terminal further has a control section that controls receipt and/or transmission of data in the second TTI, which is embedded in the first TTI, based on the scheduling information.

4 Claims, 19 Drawing Sheets

(56) References Cited

OTHER PUBLICATIONS

InterDigital Communications; "Control Plane Aspects for Interworking between NR and LTE"; 3GPP TSG-RAN WG2 #93bis, R2-162785; Dubrovnik, Croatia; Apr. 11-15, 2016 (6 pages).
Ericsson; "Study of shorter TTI for latency reduction"; 3GPP TSG-RAN WG2 #91bis, Tdoc R2-154740; Malmo, Sweden; Oct. 5-9, 2015 (9 pages).
ETRI; "Discussion cn TTI shortening"; 3GPP TSG RAN WG1 Meeting #83, R1-157110; Anaheim, USA; Nov. 16-20, 2015 (7 pages).
3GPP TS 36.300 V8.12.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Mar. 2010 (149 pages).
Extended European Search Report issued in counterpart European Patent Application No. 17796109.1, dated Nov. 8, 2019 (9 pages).
Huawei, HiSilicon; "Control signaling enhancements for short TTI"; 3GPP TSG RAN WG1 Meeting #83, R1-156461; Anaheim, USA; Nov. 15-22, 2015 (6 pages).

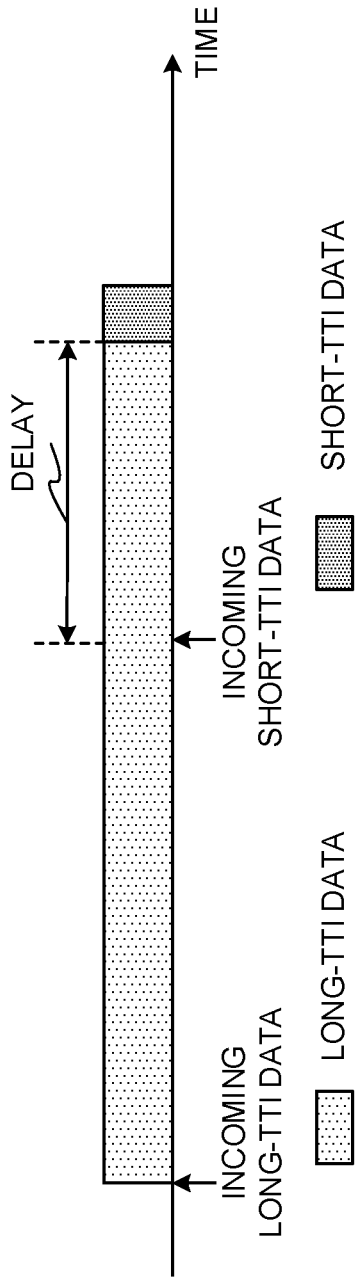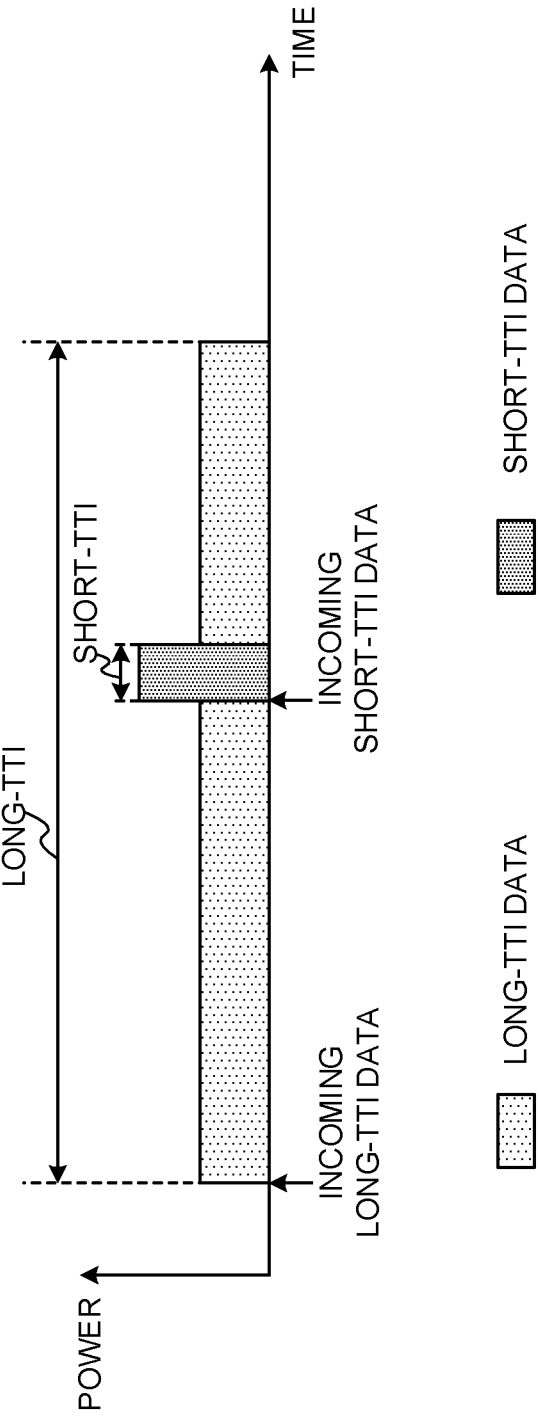

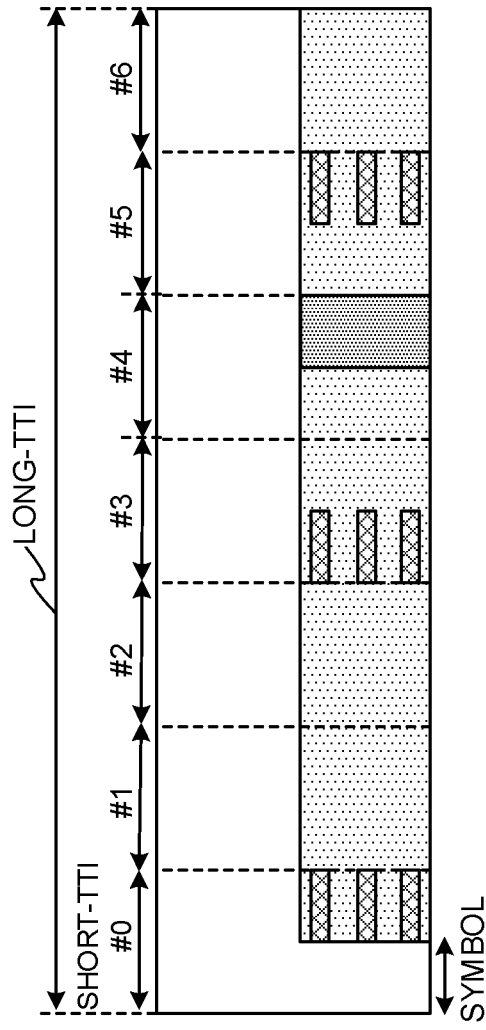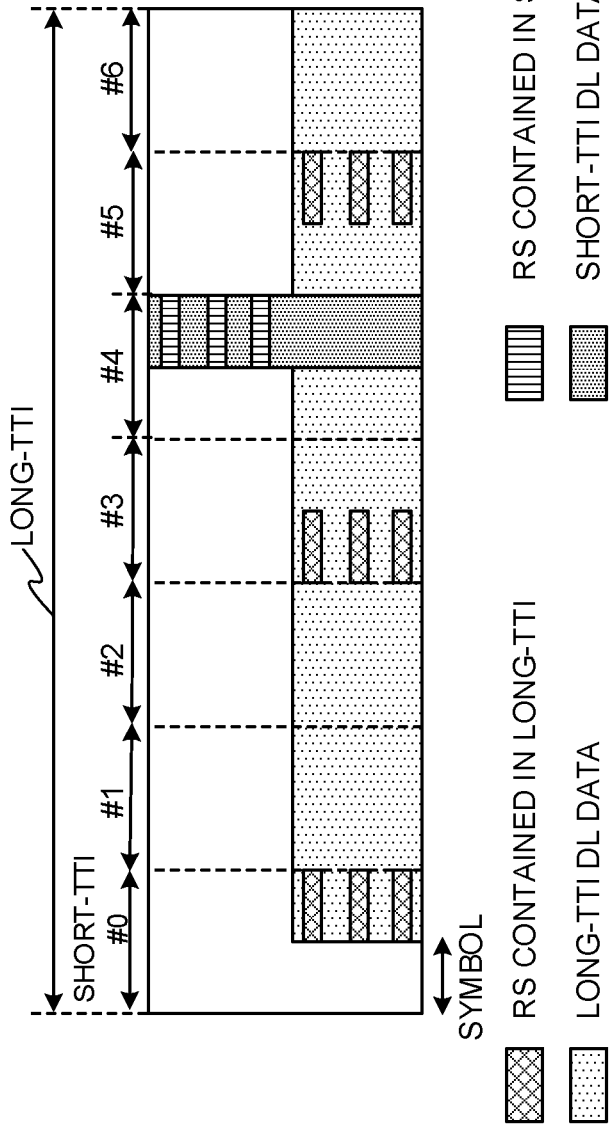
FIG. 5A
FIG. 5B

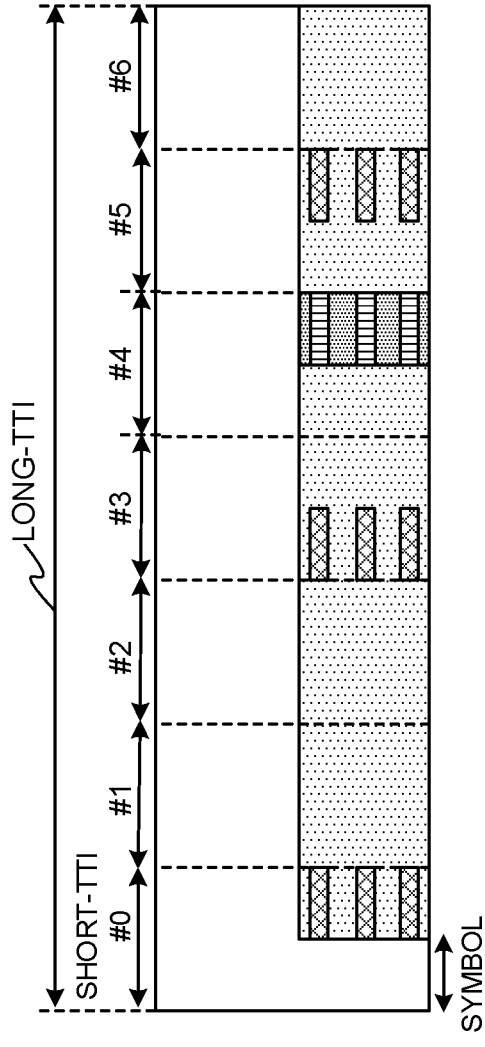
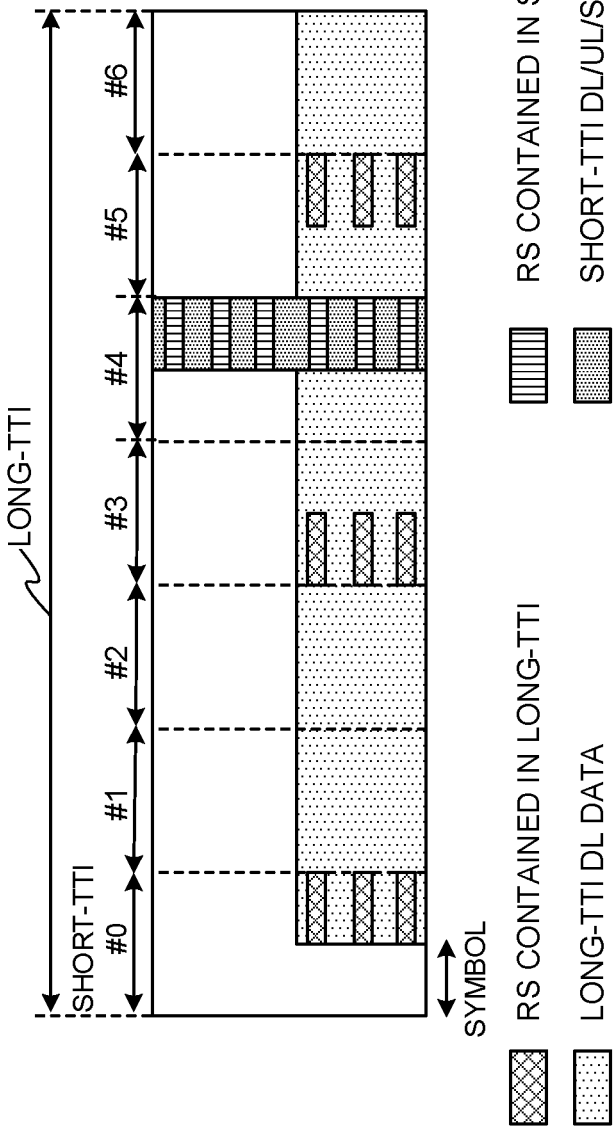
FIG. 6A
FIG. 6B

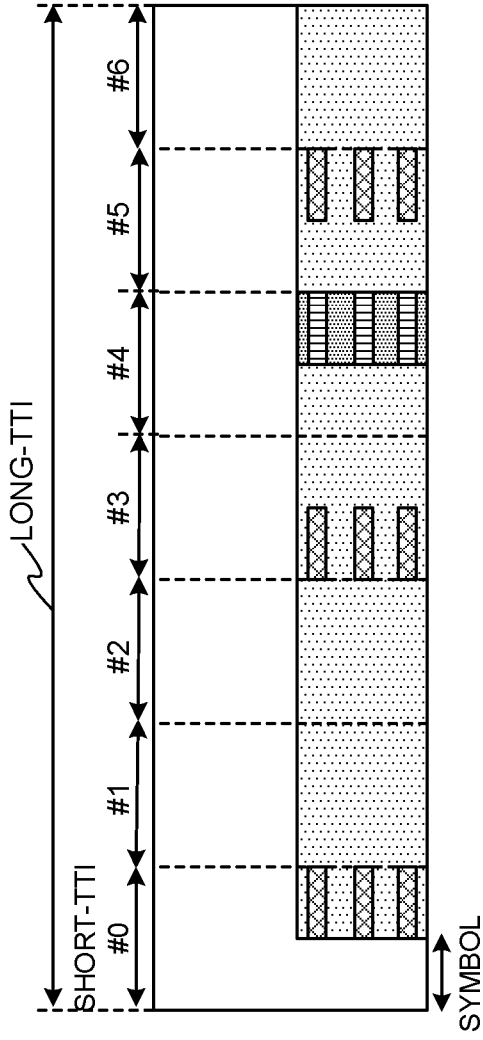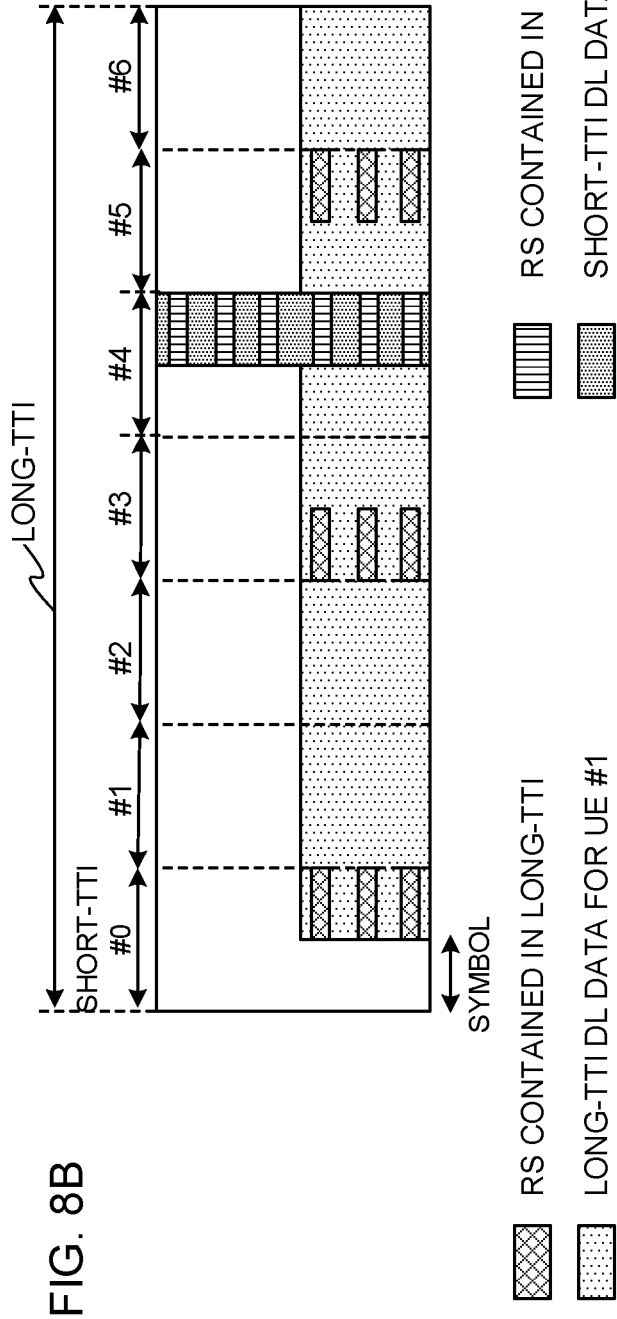
FIG. 8A
FIG. 8B

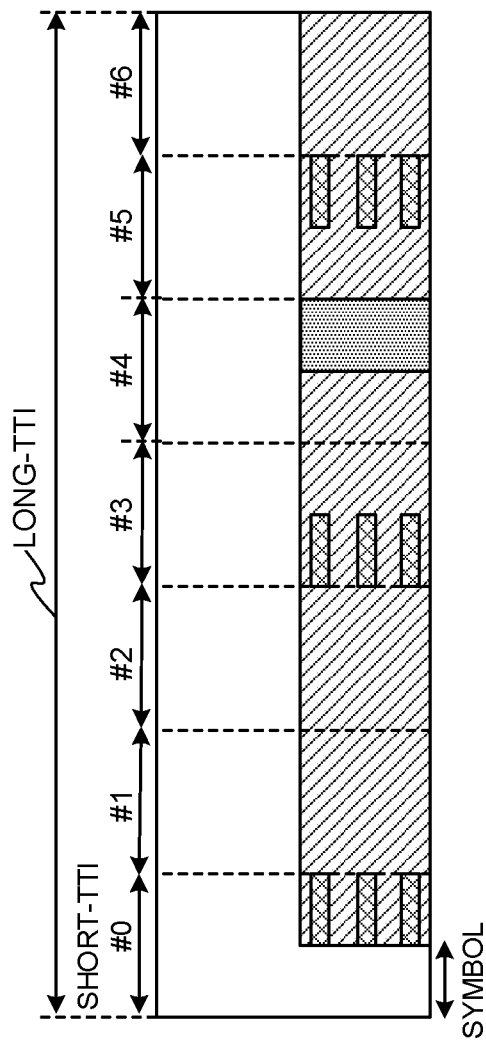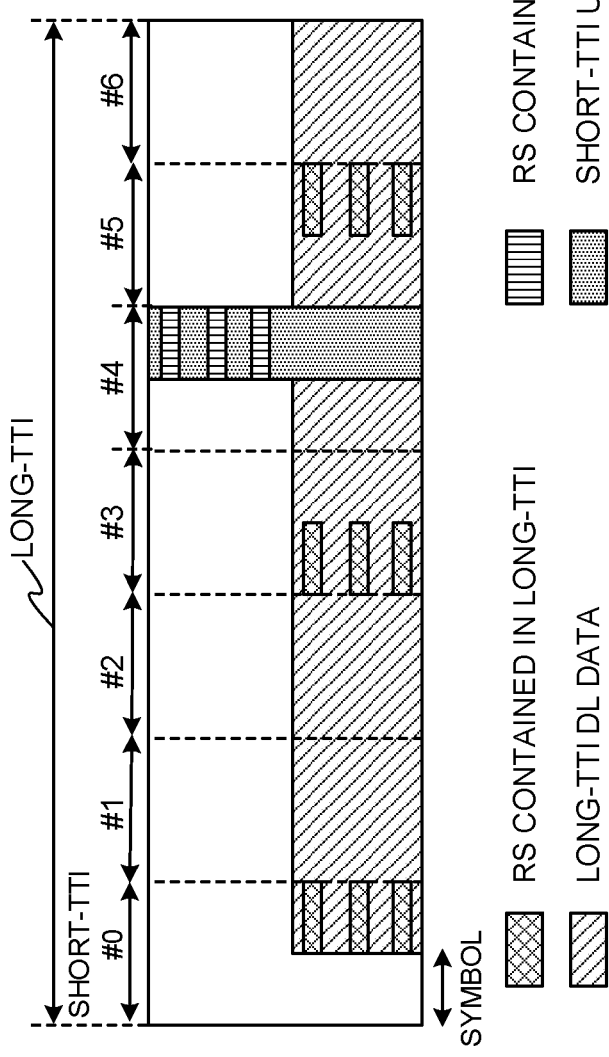
FIG. 10A
FIG. 10B

USER TERMINAL AND RADIO COMMUNICATION METHOD TO ACHIEVE A SATISFACTORY LATENCY-REDUCING EFFECT WHEN MULTIPLE TTIS OF DIFFERENT TIME DURATIONS ARE USED IN THE SAME CARRIER

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 10 and later versions), carrier aggregation (CA) to integrate multiple carriers (component carriers (CCs), cells, etc.) is introduced in order to achieve broadbandization. Each carrier is configured with the system bandwidth of LTE Rel. 8 as one unit.

In addition, in CA, multiple CCs under the same radio base station (eNB (eNodeB)) are configured in a user terminal (UE (User Equipment)).

Meanwhile, in existing LTE systems (for example, LTE Rel. 12 and later versions), dual connectivity (DC), in which multiple cell groups (CGs) formed by different radio base stations are configured in a user terminal, is also introduced. Each cell group is comprised of at least one cell (CC, cell, etc.). In DC, since multiple CCs of different radio base stations are integrated, DC is also referred to as "inter-eNB CA."

In existing LTE systems (for example, LTE Rels. 8 to 13), downlink (DL) and/or uplink (UL) communication are carried out using 1-ms transmission time intervals (TTIs). This 1-ms TTI is the unit of time to transmit one channel-encoded data packet, and is the processing unit in scheduling, link adaptation and so on. A TTI of 1 ms is also referred to as a "subframe," a "subframe duration" and/or the like.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF THE INVENTION

Technical Problem

Envisaging future radio communication systems (for example, LTE Rel. 14, etc.), a study is in progress to support TTIs (hereinafter also referred to as "short TTIs") that are shorter than the 1-ms TTIs (hereinafter also referred to as "long TTIs") of existing LTE systems, in order to reduce latency (latency reduction).

Also, in future radio communication systems (for example, 5G, NR, etc.), it is desirable to accommodate various services such as high-speed and large-capacity communication (eMBB (enhanced Mobile Broad Band)), massive access (mMTC (massive MTC)) from devices (user terminals) for inter-device communication (M2M (Machine-to-Machine)) such as IoT (Internet of Things) and MTC (Machine Type Communication), and low-latency, reliable communication (URLLC (Ultra-Reliable and Low Latency Communication)), in a single framework. URLLC is required to provide a higher latency-reducing effect than eMBB and mMTC.

Thus, there is a likelihood that a plurality of services with different requirements for latency reduction will be co-present in future radio communication systems. So, for future radio communication systems, research is underway to support multiple TTIs (for example, a long TTI and a short TTI) with different time durations in the same carrier (CC, cell, etc.). However, when multiple TTIs of different time durations are used in the same carrier, there is a fear that a satisfactory latency-reducing effect cannot be achieved.

The present invention has been made in view of the above, and it is therefore an object of the present invention to provide a user terminal and radio communication method that can achieve a satisfactory latency-reducing effect when multiple TTIs of different time durations are used in the same carrier.

Solution to Problem

According to one aspect of the present invention, a user terminal has a receiving section that receives scheduling information pertaining to a second transmission time interval (TTI), which is shorter than a first TTI, and a control section that controls receipt and/or transmission of data in the second TTI, which is embedded in the first TTI, based on the scheduling information.

Technical Advantage of the Invention

According to the present invention, when a plurality of TTIs of different time durations are used in the same carrier, a satisfactory latency-reducing effect can be achieved.

BRIEF DESCRIPTION OF THE DRAWINGS

FIGS. 1A and 1B are diagrams to illustrate examples of co-existence of long TTIs and short TTIs;

FIGS. 5A and 5B are diagrams, each illustrating a first example of arrangement of reference signals, according to the first aspect;

FIGS. 6A and 6B are diagrams, each illustrating a second example of arrangement of reference signals, according to the first aspect;

FIGS. 8A and 8B are diagrams, each illustrating yet another example of an interrupt by a short TTI, according to the first aspect;

FIGS. 10A and 10B are diagrams, each illustrating a first example of arrangement of reference signals, according to the second aspect;

DESCRIPTION OF EMBODIMENTS

Figure 2:
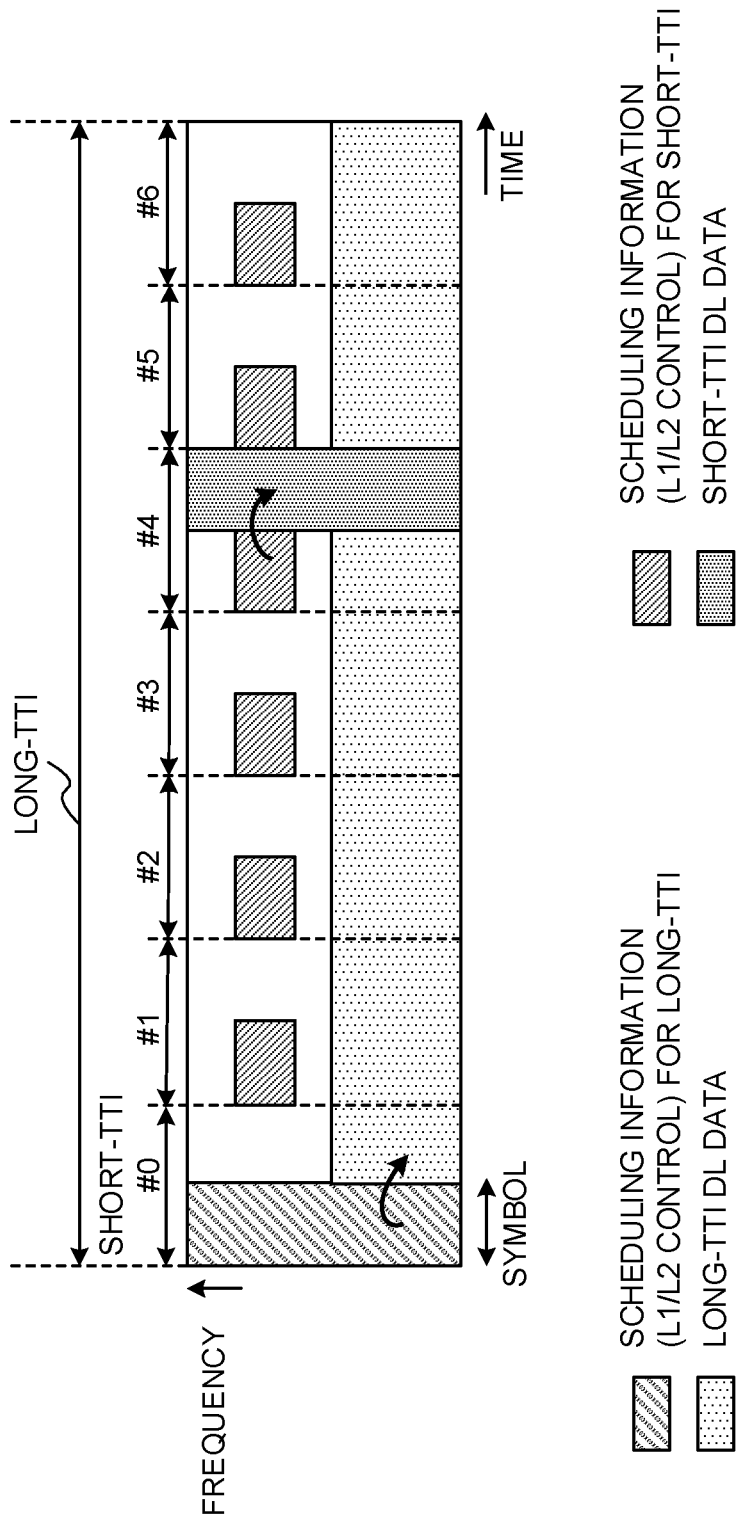
FIG. 2 is a diagram to illustrate an example of an interrupt by a short TTI, according to a first aspect of the present invention.

FIG. 1 are diagrams to illustrate examples of co-existence of long TTIs and short TTIs. A long TTI refers to a TTI having a longer time duration than a short TTI, and may be referred to as a "normal TTI," a "subframe," a "long subframe," and a "normal subframe," or may be referred to simply as a "TTI," a "subframe," and others. A long TTI is, for example, 1 ms, and comprised of fourteen symbols when a normal cyclic prefix (CP) is used, or comprised of twelve symbols when an enhanced CP is used. A long TTI may be suitable for services that do not require latency reduction so strictly, such as eMBB, mMTC and so on. Note that the time duration of a long TTI is not limited to 1 ms, as long as it is longer than a short TTI.

On the other hand, a short TTI refers to a TTI having a shorter time duration than a long TTI, and may be referred to as a "partial TTI," a "short subframe," a "partial subframe" and so on. A short TTI is comprised of fewer symbols (for example, two symbols) than a long TTI, and the time duration of each symbol (symbol duration) may be the same as that in a long TTI (for example, 66.7 µs). Alternatively, a short TTI may be comprised of the same number of symbols as a long TTI, and the symbol duration of each symbol may be shorter than that in a long TTI. Short TTIs may be used for services that require latency reduction strictly, such as URLLC.

FIG. 1A illustrates an example in which a long TTI and a short TTI are used in the same carrier (CC, cell, etc.). As illustrated in FIG. 1A, when data that needs to be transmitted using a short TTI is produced in the middle of a long TTI, even if this data is transmitted or received in a short TTI after the long TTI ends, the effect of delay (latency) reduction accompanying the introduction of the short TTI may not be achieved on a satisfactory level.

So, the present inventors have studied a method of achieving satisfactory latency-reducing effect with short TTIs when long TTIs and short TTIs are used in the same carrier, and arrived at the present invention. To be more specific, the present inventors have come up with the idea of embedding a short TTI in the middle of a long TTI (by allowing a short TTI to interrupt a long TTI), as illustrated in FIG. 1B, so that, even when data that needs to be transmitted in a short TTI is produced in the middle of a long TTI, this data can be transmitted or received without delay.

Now, embodiments of the present invention will be described below in detail with reference to the accompanying drawings. Also, according to the present embodiment, a short TTI (second TTI) can be configured in any way as long as its time duration is shorter than a long TTI (first TTI). Although an example will be described below in which a short TTI is comprised of fewer symbols than a long TTI, and in which each symbol has the same symbol duration as in a long TTI, this example can be appropriately applied even when a short TTI has a different symbol duration from that of a long TTI.

Also, according to the present embodiment, long TTIs and/or short TTIs can also be applied to DL communication, in which user terminals receive signals from radio base stations, UL communication, in which user terminals transmit signals to radio base stations, and side-link (SL) receipt or transmission in inter-terminal communication (D2D (Device to Device)), in which signals are transmitted and received between user terminals. In the following, when reference is made simply to "DL communication," this may cover SL receipt. Likewise, in case reference is made simply to "UL communication," this may cover SL transmission. Likewise, when simply "DL data" and/or "UL data" are mentioned, SL data may be included.

Also, the user terminal of the present embodiment, may be a user terminal that can use long TTIs and short TTIs, or may be a user terminal that can only use either long TTIs or short TTIs. Furthermore, according to the present embodiment, the transmission power in long TTIs and the transmission power in short TTIs may be controlled separately (see, for example, FIG. 1B), or may be controlled together.

(First Aspect)

According to a first aspect of the present invention, a short TTI, which is for performing DL communication (including SL receipt) or UL communication (including SL transmission), is embedded in (interrupts) a long TTI, which is for performing DL communication (including SL receipt). According to the first aspect, a user terminal receives scheduling information for short TTIs, and, based on this scheduling information, controls receipt and/or transmission in short TTIs, which are embedded in long TTIs where DL communication takes place.

<Example of Embedding Short TTI Addressed to the Same User Terminal>

Now, with reference to FIG. 2 to FIG. 4, cases will be described below, in which data to address the same user terminal is allocated to a long TTI, which is for performing DL communication (including SL receipt), and a short TTI, which is for performing DL communication (including SL receipt) or UL communication (including SL transmission).

FIG. 2 is a diagram to illustrate an example of an interrupt by a short TTI for performing DL communication (including SL receipt) according to the first aspect. As illustrated in FIG. 2, a short TTI (here, short TTI #4) for performing DL communication (including SL receipt) may be embedded in a long TTI, which is for performing DL communication (including SL receipt).

As illustrated in FIG. 2, a long TTI includes a plurality of short TTIs (here, short TTIs #0 to #6). FIG. 2 illustrates an example where a long TTI is formed with fourteen symbols and each short TTI is formed with two symbols, the configurations of a long TTI and a short TTI, and the number of short TTIs in a long TTI are not limited to these.

As illustrated in FIG. 2, in a long TTI, DL (SL) data for the long TTI (hereinafter also referred to as "long TTI DL data") and scheduling information pertaining to this long TTI (allocation information, DL assignment, etc.) are allocated. The long TTI DL data may be communicated in a DL (SL) data channel (also referred to as, for example, "PDSCH (Physical Downlink Shared CHannel)," "PSSCH (Physical Sidelink Shared CHannel)," "DL (SL) shared channel," etc.).

Scheduling information of a long TTI refers to information for use in the receiving process of the long-TTI, such as information about the frequency resource (for example, resource blocks (PRBs (Physical Resource Blocks)), etc.) allocated to the DL data in the long TTI. This long TTI-scheduling information may be communicated in a scheduling control channel (also referred to as, for example, "PDCCH (Physical Downlink Control CHannel)" and/or "EPDCCH (Enhanced Physical Downlink Control CHannel)," "DL control channel," and "layer 1/layer 2 (L1/L2) control channel").

In FIG. 2, the mapping (allocation) field for long TTI scheduling information is provided in a predetermined number of symbols (one symbol in this case) at the beginning of a long TTI, but this is by no means limiting. The mapping field for long TTI scheduling information may be time-divided and/or frequency-divided with the mapping field for long TTI DL data. The mapping field for long TTI DL data is comprised of a predetermined number of frequency resources (for example, PRBs) specified by scheduling information.

Also, in at least one short TTI in a long TTI, a mapping field for short TTI scheduling information is provided. For example, in FIG. 2, a mapping field for scheduling information is provided in each of short TTIs #1 to #6. Note that FIG. 2 is simply an example, and this is by no means limiting. This mapping field may be provided only in part of the short TTIs in a long TTI, or may be provided in all of the short TTIs (for example, #0 to #6).

Also, although, in FIG. 2, the scheduling information mapping fields in short TTIs #1 to #6 are each provided in a predetermined number of symbols (here, one symbol) in short TTIs #1 to #6, this is by no means limiting. The scheduling information mapping field in a short TTI may be time-divided and/or frequency-divided with the mapping field for DL (SL) data for the short TTI (hereinafter also referred to as "short TTI DL data").

Furthermore, in short TTIs #1 to #6, the scheduling information mapping field may or may not be included in the mapping field for long TTI DL data. For example, in FIG. 2, the scheduling information mapping fields in short TTI #1 to #6 are provided in frequency resources that are different from those of the long TTI DL data mapping fields.

The mapping field for short TTI DL data is indicated by short TTI scheduling information. In FIG. 2, the mapping field for short TTI DL data in short TTI #4 is comprised of resources that overlap, and resources that do not overlap, with the long TTI DL data mapping field, but this is by no means limiting. The mapping field for short TTI DL data may be included in the mapping field for long TTI DL data.

Also, in resources where the mapping field for short TTI scheduling information and/or short TTI DL data and the mapping field for long TTI DL data overlap, the long TTI DL data may be punctured. For example, in FIG. 2, in a resource where a short TTI DL data mapping field and a long TTI DL data mapping field overlap each other, the long TTI DL data is punctured.

Also, short TTI scheduling information may be communicated in a scheduling control channel (also referred to as "L1/L2 control channel," "DL control channel," etc.). Also, short TTI DL data may be communicated in a DL (SL) data channel (also referred to as "DL (SL) shared channel," etc.).

In FIG. 2, a user terminal monitors (blind-decodes) the scheduling control channel for the long TTI, and, upon detecting scheduling information for long TTI DL data addressed to this user terminal, the user terminal performs the receiving process (for example, receipt, demodulation, decoding, etc.) of the long TTI DL data based on the scheduling information.

Also, the user terminal monitors (blind-decodes, demodulates, etc.) the short TTI scheduling control channel, while receiving the above long TTI DL data. When the user terminal detects scheduling information for short TTI DL data, the user terminal performs the receiving process (for example, receipt, demodulation, decoding, etc.) of the short TTI DL data based on the scheduling information. For example, in FIG. 2, the user terminal detects scheduling information in short TTI #4, and performs the receiving process for the short TTI DL data based on this scheduling information.

Note that the user terminal may perform demodulation of the long TTI scheduling control channel and demodulation of the short TTI scheduling control channel in parallel, or sequentially.

Figure 3:
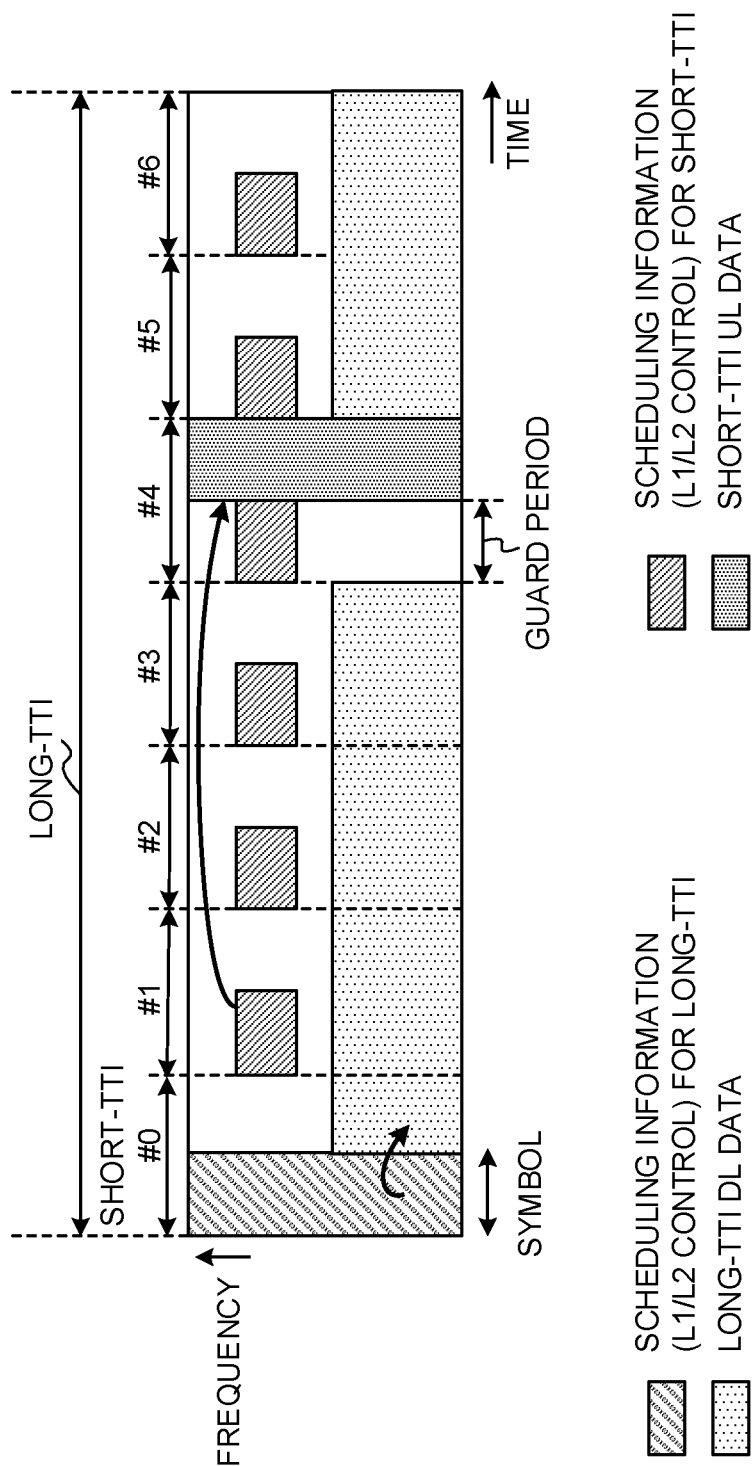
FIG. 3 is a diagram to illustrate another example of an interrupt by a short TTI, according to the first aspect.

FIG. 3 is a diagram to illustrate an example of an interrupt by a short TTI for performing UL communication (including SL transmission), according to the first aspect. As illustrated in FIG. 3, a short TTI (here, short TTI #4), which is for performing UL communication (including SL transmission) may be embedded in a long TTI, which is for performing DL communication (including SL receipt). Note that, with reference to FIG. 3, differences from the case (FIG. 2) of embedding a short TTI for performing DL communication will be primarily described.

As illustrated in FIG. 3, in at least one short TTI in a long TTI, a mapping field for short TTI scheduling information (also referred to as "UL grant," "allocation information," etc.) is provided. For example, in FIG. 3, a mapping field for scheduling information is provided in each of short TTIs #1 to #6. Note that FIG. 3 is simply an example, and this is by no means limiting. The mapping field may be provided only in part of the short TTIs in a long TTI, or may be provided in all of the short TTIs (for example, #0 to #6).

Also, as illustrated in FIG. 3, a guard period for switching between DL communication (receipt) and UL communication (transmission) may be provided between the mapping field for long TTI DL data and the mapping field for short TTI UL data. Also, although not illustrated, a guard period may also be provided after the mapping field for short TTI UL data.

In FIG. 3, the user terminal monitors (blind-decodes, demodulates, etc.) the short TTI scheduling control channel, while receiving the above long TTI DL data. When the user terminal detects scheduling information for short TTI DL data, the user terminal performs the transmission process (for example, encoding, modulation, transmission, etc.) of the short TTI UL (SL) data based on the scheduling information.

For example, in FIG. 3, the user terminal detects scheduling information for short TTI #4 in short TTI #1, performs the transmission process in short TTI #4 based on this scheduling information. Also, after the UL (SL) transmission in short TTI #4 is complete, the user terminal may return to DL (SL) receipt in the long TTI and perform the receiving process of the long TTI DL data. In this case, a guard period may be provided after short TTI #4.

Note that, when a short TTI for performing DL communication or UL communication is embedded in a long TTI, which is for performing DL communication, as has been described with reference to FIG. 2 and FIG. 3, the mapping field for scheduling information (DL assignments or UL grants) for short TTIs may be provided in frequency resources that are different from the mapping field for long TTI DL data. Alternatively, the mapping field for short TTI scheduling information may be included in the mapping field for long TTI DL data.

Figure 4:
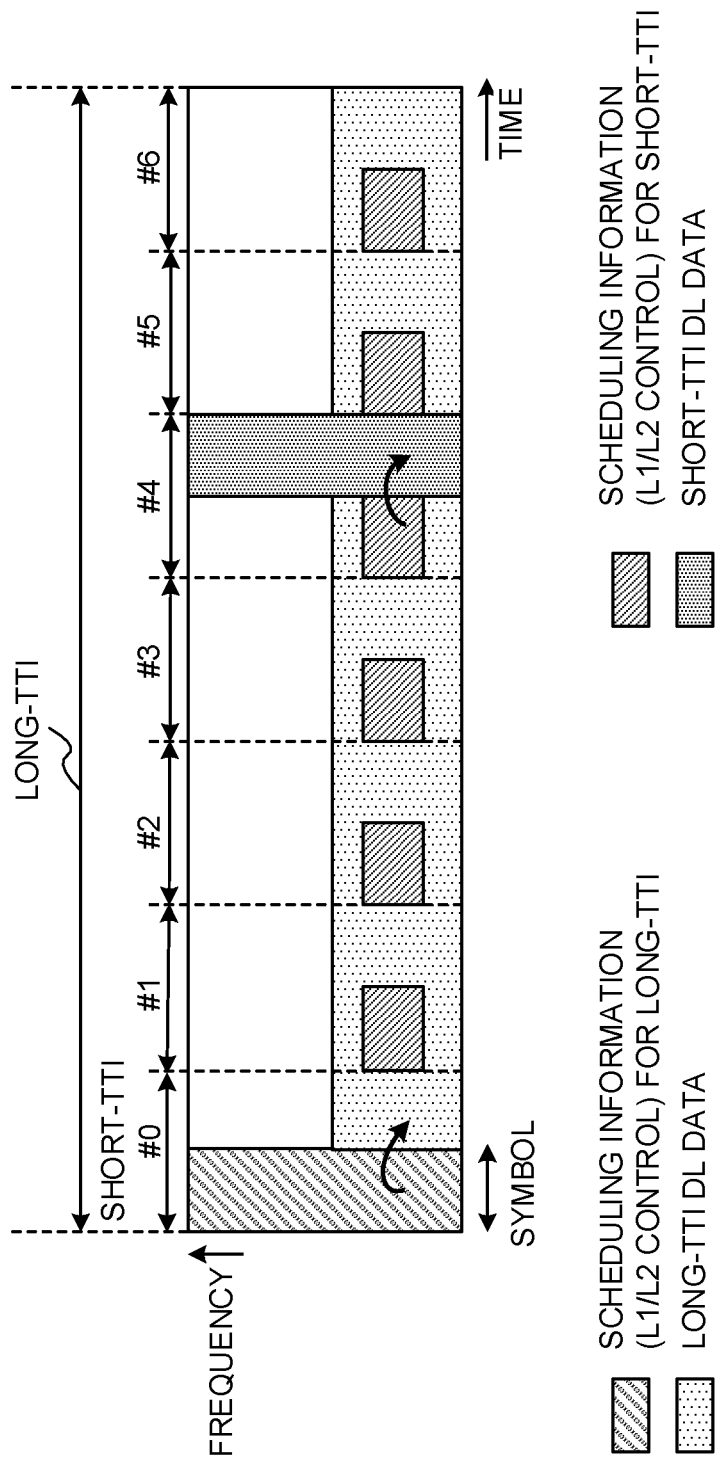
FIG. 4 is a diagram to illustrate yet another example of an interrupt by a short TTI, according to the first aspect.

FIG. 4 is a diagram to illustrate another example of an interrupt by a short TTI for performing DL communication, according to the first aspect. As illustrated in FIG. 4, the mapping field for short TTI scheduling information may be included in the mapping field for long TTI data. For example, in FIG. 4, scheduling information for short TTIs is mapped to a predetermined number of frequency resources included in the mapping field for long TTI DL data.

In FIG. 4, the user terminal monitors (blind-decodes, demodulates, etc.) the scheduling control channel for short TTIs, which is allocated in the mapping field for long TTI DL data. When the user terminal detects scheduling information for short TTI DL data, the user terminal performs the receiving process (for example, receipt, demodulation, decoding, etc.) of the short TTI DL data based on the scheduling information.

For example, in FIG. 4, in a resource where the mapping field for a short TTI scheduling control channel and the mapping field for long TTI DL data overlap each other, the long TTI DL data is punctured. The user terminal detects the scheduling information in short TTI #4, and performs the receiving process of the short TTI DL data based on this scheduling information.

Note that, although an example has been illustrated with FIG. 4 where, when DL (SL) data is received in a short TTI, a scheduling control channel for short TTIs, which is mapped in the mapping field for long TTI DL data, is monitored, the present invention can also be appropriately applied to the case where UL (SL) data is transmitted in a short TTI. In this case, as has been described with reference to FIG. 3, a guard period may be provided immediately before (and immediately after) the mapping field for the UL (SL) data of the short TTI.

Below, although the scheduling control channels (scheduling information) for long TTIs and short TTIs will not be illustrated in accordance with the first aspect, in the long TTIs and short TTIs described below, as has been explained with reference to FIGS. 2 to 4, receipt of DL (SL) data and transmission of UL (SL) data are controlled based on scheduling information, which is communicated in a scheduling control channel.

Now, with reference to FIG. 5 and FIG. 6, examples of allocation of reference signals in the event data to address the same user terminal is allocated to a long TTI, which is for performing DL communication (including SL receipt), and to a short TTI, which is for performing DL communication (including SL receipt), will be described. In this case, DL (SL) receipt in the short TTI may be performed by using a first reference signal that is allocated to the long TTI (first example of arrangement), or by using a second reference signal that is allocated to the short TTI (second example of arrangement). The first and/or second reference signal may be referred to as "demodulation reference signals," "channel estimation reference signals," and so on.

FIG. 5 provide diagrams, each illustrating a first example of arrangement of reference signals, according to a first aspect of the present invention. As illustrated in FIG. 5A, when the mapping field for short TTI DL data is constituted by the same frequency resource as that of the mapping field for long TTI DL data, it is possible to only arrange the first reference signal in the long TTI, without arranging the second reference signal in the short TTI.

In the case illustrated in FIG. 5A, the user terminal may demodulate the short TTI DL data by using the first reference signal for the long TTI. In this case, it is not necessary to arrange the second reference signal in the short TTI, so that the overhead in the short TTI can be reduced.

Referring to FIG. 5A, the first reference signal of a specific port number can be used to demodulate the DL data channel for the short TTI. The specific port number may be selected in advance, or may be configured in the user terminal by higher layer signaling (for example, RRC (Radio Resource Control) signaling).

Meanwhile, as illustrated in FIG. 5B, when the mapping field for short TTI DL data is comprised of a frequency resource that overlaps the mapping field for long TTI DL data (overlapping resource) and a frequency resource that does not overlap the mapping field for long TTI DL data (non-overlapping resource), the second reference signal may be arranged only in the non-overlapping resource.

In the case illustrated in FIG. 5B, the user terminal may demodulate the short TTI DL data mapped to the overlapping resource by using the first reference signal, and demodulate the short TTI DL data mapped to the non-overlapping resource by using the second reference signal. As a result of this, it is possible to appropriately demodulate the DL data allocated to the short TTI, while reducing the overhead of the second reference signal in the short TTI.

FIG. 6 provide diagrams, each illustrating a second example of arrangement of reference signals, according to the first aspect. As illustrated in FIG. 6A, even when the mapping field for short TTI DL data is constituted by the same frequency resource as that of the mapping field for long TTI DL data, separate reference signals may be arranged in the long TTI and the short TTI.

In the case illustrated in FIG. 6A, the user terminal may demodulate the long TTI DL data by using the first reference signal for the long TTI, and demodulate the short TTI DL data by using the second reference signal for the short TTI. In this case, different beam forming and/or rank control (control of the number of layers in space multiplexing) can be applied to the long TTI and the short TTI.

Likewise, as illustrated in FIG. 6B, when the mapping field for short TTI DL data is comprised of a resource that overlaps with the mapping field for long TTI DL data and a resource that does not overlap with the mapping field for long TTI DL data, the second reference signal may be arranged in both the overlapping resource and the non-overlapping resource.

Note that, although not illustrated, when a short TTI for performing UL communication is embedded in a long TTI, which is for performing DL communication (including SL transmission), as illustrated in FIG. 6, a second reference signal for use for demodulating UL data for the short TTI is arranged in the short TTI, apart from the long TTI.

Now, with reference to FIG. 7, the receiving process of long TTI DL data in the event data to address the same user terminal is allocated to a long TTI, which is for performing DL communication (including SL receipt), and a short TTI, which is for performing DL communication (including SL receipt) or UL communication (including SL transmission) will be described below. In the even a predetermined condition is fulfilled, the user terminal does not have to demodulate the long TTI data. Note that the receiving process of long TTI data that will be described below can also be applied to the case where DL communication (including SL receipt) or UL communication (including SL transmission) takes place in short TTIs.

Figure 7:
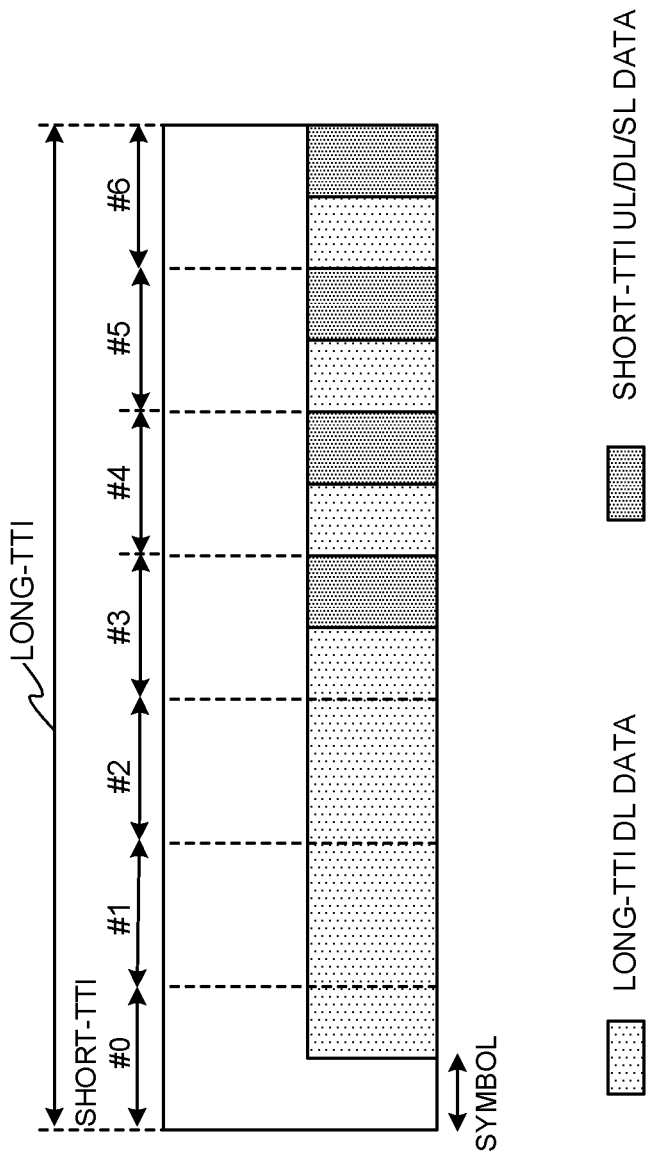
FIG. 7 is a diagram to explain the receiving process of long TTI DL data, according to the first aspect.

FIG. 7 is a diagram to explain the receiving process of long TTI data according to the first aspect. FIG. 7 illustrates a case where short TTI data (including DL data, UL data and SL data) is allocated to each of short TTIs #3 to #6 in a long TTI. Note that, when short TTI UL data is allocated to short TTIs #3 to #6, a guard period may be provided between the mapping field for the short TTI UL data and the mapping field for the long TTI DL data (FIG. 3).

As illustrated in FIG. 7, when short TTI data is allocated to more than a predetermined number of short TTIs in a long TTI, in a resource where the mapping field for short TTI data and the mapping field for long TTI DL data overlap, the long TTI DL data is punctured. In this case, there is a possibility that this long TTI DL data cannot be demodulated.

Therefore, if a predetermined condition is fulfilled, the user terminal does not have to demodulate the long TTI DL data. For example, if the effective coding rate of the long TTI DL data exceeds a predetermined value (for example, 0.931), the user terminal does not have to demodulate the long TTI DL data. Here, the effective coding rate may be calculated based on, for example, the transport block size (TBS) and the total number of resource elements (REs) to which the long TTI data channel is allocated. Also, the TBS may be divided by the value determined by multiplying the total number of resource elements (REs) by the number of MIMO layers, the m-ary modulation value and so on, and the effective coding rate can be calculated using this value.

Also, when short TTI data is allocated to more than a predetermined number of short TTIs in a long TTI, the user terminal does not have to demodulate the long TTI DL data. Thus, the user terminal may decide whether or not to demodulate long TTI data based on various parameters such as the effective coding rate of long TTI DL data and/or the number of short TTIs where short TTI data is allocated.

Also, even when the user terminal does not demodulate long TTI DL data for long TTI based on the above predetermined conditions, the user terminal may generate and transmit retransmission control information (for example, HARQ (Hybrid Automatic Repeat reQuest)-ACK, ACK or NACK) in response to this long TTI DL data.

Even when the user terminal recognizes that long TTI DL data is allocated, the user terminal may nevertheless fail to detect short TTI data that is allocated. Accordingly, the user terminal transmits retransmission control information in response to long TTI DL data, irrespective of whether or not the above predetermined conditions are fulfilled, so that it is possible to prevent inconsistencies in the understanding of the codebook (HARQ-ACK codebook) for use for retransmission control, the format of UL control channels (PUCCH format) and so on, between the radio base station and the user terminal.

<Example of Embedding Short TTI Addressed to Different User Terminal>

Now, with reference to FIG. 8, a case will be described here, in which data that is addressed to different user terminals is allocated to a long TTI, which is for performing DL communication (including SL receipt), and a short TTI, which is for performing DL communication (including SL receipt) or UL communication (including SL transmission). Below, differences from the case where data addressed to the same user terminal is allocated to a long TT for performing DL communication and a short TTI for performing DL communication or UL communication will be primarily described.

FIG. 8 provide diagrams, each illustrating an example of an interrupt by a short TTI addressed to a different user terminal according to the first aspect. As illustrated in FIG. 8, in a long TTI for performing DL communication, a short TTI (here, short TTI #4), in which a different user terminal from that of the long TTI performs DL communication or UL communication, may be embedded. When UL communication is assigned in short TTI #4, a guard period may be provided between DL data for the short TTI and UL data for the long TTI.

FIGS. 8A and 8B illustrate cases where long TTI DL data is allocated to user terminal #1, and where, in short TTI #5, short TTI DL data is allocated to user terminal #2. In FIGS. 8A and 8B, user terminals #1 and #2 need not be capable of receiving long TTI DL data and short TTI DL data in parallel (simultaneously).

Furthermore, information regarding receipt of long TTI DL data and short TTI DL data may be configured in advance, for each of user terminals #1 and #2, by higher layer signaling. To be more specific, the TTI duration to use in DL and/or UL communication can be configured by user terminal-specific higher layer signaling. In this case, the user terminals can operate to use the configured TTI duration semi-statically (that is, the user terminal does not switch the configured TTI duration dynamically, in units of time such as subframes). For example, in the example of FIG. 8, user terminal #1 communicates only in the long TTI, and user terminal #2 communicates only in the short TTI.

When long TTI DL data and the short TTI DL data in short TTI #4 are allocated to different user terminals, regardless of whether the mapping field for short TTI DL data partially or completely overlaps (is included in) the mapping field for long TTI DL data, as illustrated in FIGS. 8A and 8B, separate reference signals may be arranged in the long TTI and the short TTI. The same is true when short TTI UL data is allocated in short TTI #4.

In FIGS. 8A and 8B, user terminal #1 demodulates the long TTI DL data by using a reference signal for the long TTI. On the other hand, user terminal #2 demodulates the short TTI DL data channel allocated to short TTI #3 by using a reference signal for the short TTI.

(Second Aspect)

According to a second aspect of the present invention, a short TTI, which is for performing DL communication (including SL receipt) or UL communication (including SL transmission), is embedded in (interrupts) a long TTI, which is for performing UL communication (including SL transmission). According to the second aspect, a user terminal receives short TTI scheduling information, and, based on this scheduling information, controls receipt and/or transmission in a short TTI that is embedded in a long TTI where DL communication takes place. Now, the second aspect will be described below, primarily focusing on differences from the first aspect.

<Example of Embedding Short TTI Addressed to the Same User Terminal>

Figure 9:
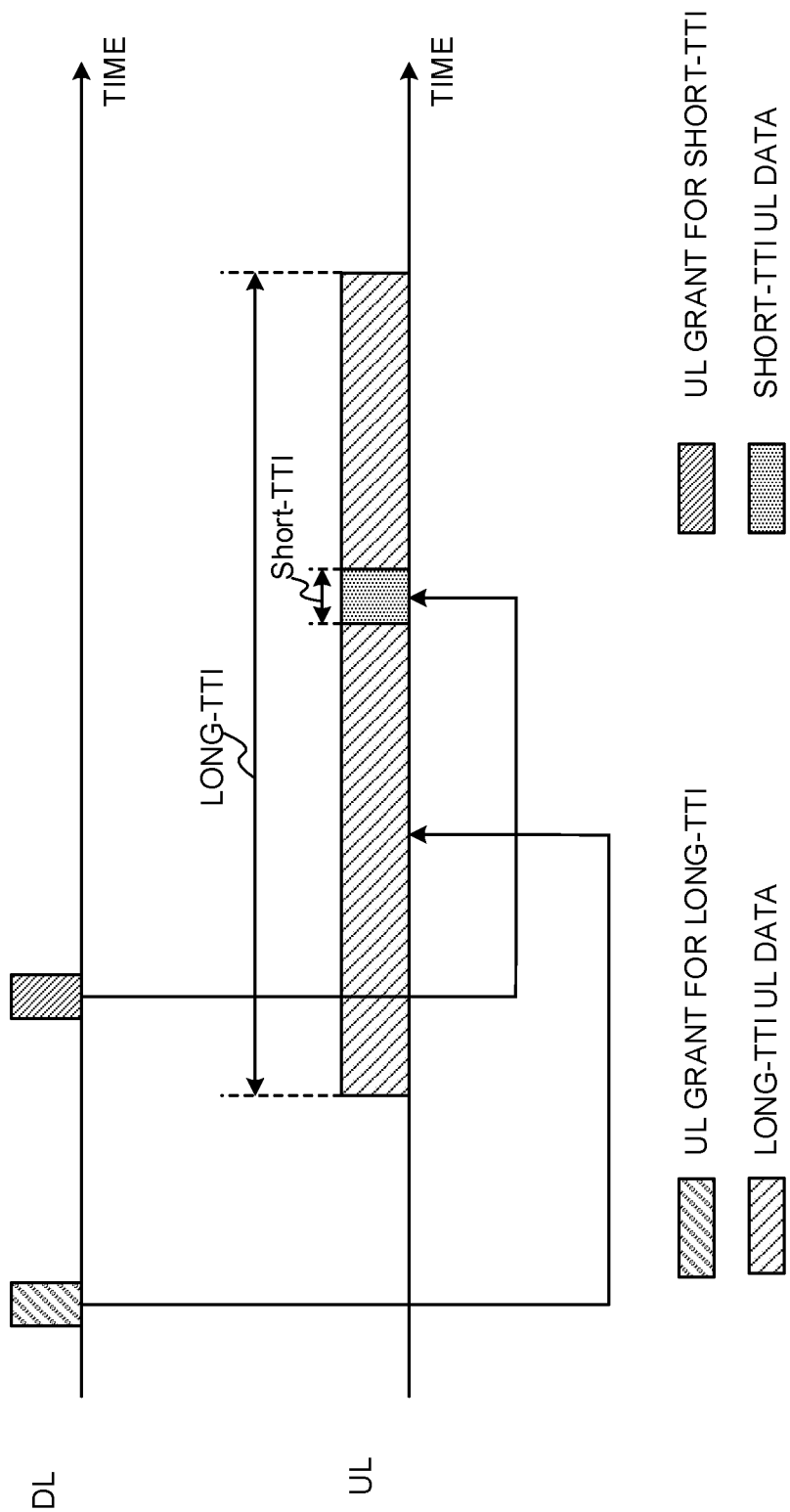
FIG. 9 is a diagram to illustrate an example of an interrupt by a short TTI, according to a second aspect of the present invention.

Now, with reference to FIG. 9 to FIG. 12, cases will be described below, in which data to address the same user terminal is allocated to a long TTI, which is for performing UL communication (including SL transmission), and a short TTI, which is for performing DL communication (including SL receipt) or UL communication (including SL transmission). FIG. 9 is a diagram to illustrate an example of embedding a short TTI for performing UL communication, according to the second aspect. Note that, although FIG. 9 illustrates a case where DL communication and UL communication are performed using different frequency resources, DL communication and UL communication may be performed using the same frequency resources.

As illustrated in FIG. 9, the user terminal receives scheduling information (for example, UL grant) pertaining to UL (SL) data for a long TTI (hereinafter also referred to as "long TTI UL data"), and transmits long TTI UL data based on this scheduling information. Furthermore, the user terminal receives scheduling information pertaining to UL (SL) data for a short TTI (hereinafter also referred to as "short TTI UL data"), and transmits short TTI UL data based on this scheduling information.

To be more specific, in FIG. 9, the user terminal monitors (blind-decodes) the scheduling control channel for the long TTI, and, upon detecting scheduling information for long TTI UL data addressed to this user terminal, the user terminal performs the transmission process (for example, encoding, modulation, transmission, etc.) of the long TTI UL data based on this scheduling information. The long TTI data is transmitted using a UL (SL) data channel (also referred to as, for example, "PUSCH (Physical Uplink Shared Channel)," "PSSCH," "UL (SL) shared channel," etc.).

Also, the user terminal monitors (blind-decodes, demodulates, etc.) the short TTI scheduling control channel, while transmitting the above long TTI UL data. When the user terminal detects scheduling information for short TTI UL data, the user terminal performs the transmission process (for example, encoding, modulation, transmission, etc.) of the short TTI UL data based on this scheduling information. The short TTI data is transmitted using a UL (SL) data channel (also referred to as, for example, "PUSCH," "PSSCH," "UL (DL) shared channel," etc.).

Note that, although, in FIG. 9, the user terminal demodulates the long TTI scheduling control channel and demodulates the short TTI scheduling control channel, sequentially, the user terminal may demodulate the long TTI scheduling control channel and the short TTI scheduling control channel in parallel.

Also, although not illustrated, the user terminal may receive scheduling information pertaining to DL (SL) data for a short TTI, while transmitting the above long TTI UL data, and receive the DL (SL) data of the short TTI (hereinafter also referred to as "short TTI DL data") based on this scheduling information. In this case, a guard period may be provided between the mapping field for long TTI UL data and the mapping field for short TTI DL data.

Below, although the scheduling control channels (scheduling information) for long TTIs and short TTIs will not be illustrated in accordance with the second aspect, in the long TTIs and short TTIs that will be described below, as has been explained with reference to FIG. 9, receipt of DL (SL) data and transmission of UL (SL) data are controlled based on scheduling information, which is communicated in a scheduling control channel.

Now, with reference to FIG. 10 and FIG. 11, examples of allocation of reference signals in the event data to address the same user terminal is allocated to a long TTI, which is for performing UL communication (including SL transmission), and to a short TTI, which is for performing UL communication (including SL transmission), will be described. In this case, the user terminal may omit at least a part of the second reference signals for the short TTI (the first example of arrangement), or arrange these second reference signals in the short TTI (the second example of arrangement).

FIG. 10 provide diagrams, each illustrating a first example of arrangement of reference signals, according to the second aspect. As illustrated in FIG. 10A, when the mapping field for short TTI UL data is constituted by the same frequency resource as that of the mapping field for long TTI UL data, it is possible to only arrange the first reference signal in the long TTI, without arranging the second reference signal in the short TTI.

In the case illustrated in FIG. 10A, the radio base station may demodulate the short TTI UL data by using the first reference signal for the long TTI. In this case, it is not necessary to arrange the second reference signals in the short TTI, so that the overhead in the short TTI can be reduced.

Referring to FIG. 10A, the first reference signal of a specific port number can be used to demodulate the short TTI UL data. The specific port number may be selected in advance, or may be configured in the user terminal by higher layer signaling (for example, RRC signaling).

Meanwhile, as illustrated in FIG. 10B, when the mapping field for short TTI UL data is comprised of a frequency resource that overlaps the mapping field for long TTI UL data (overlapping resource) and a frequency resource that does not overlap the mapping field for long TTI UL data (non-overlapping resource), the user terminal may skip arranging the second reference signal in the overlapping resource, and arrange the second reference signal only in the non-overlapping resource.

In the case illustrated in FIG. 10B, the user terminal may demodulate the short TTI UL data mapped to the overlapping resource by using the first reference signal, and demodulate the short TTI UL data mapped to the non-overlapping resource by using the second reference signal. As a result of this, it is possible to appropriately demodulate the UL data allocated to the short TTI, while reducing the overhead of the second reference signal in the short TTI.

Figure 11A:
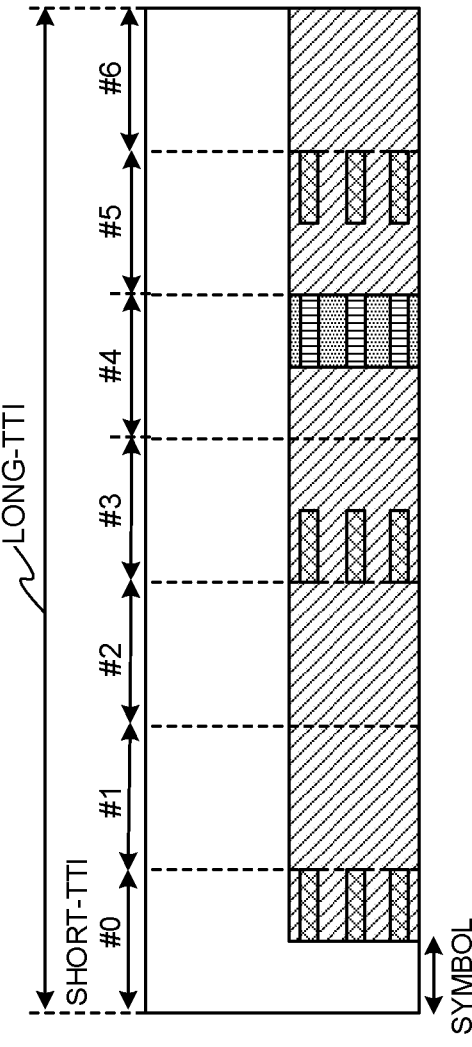
FIGS. 11A and 11B are diagrams, each illustrating a second example of arrangement of reference signals, according to the second aspect.

FIG. 11 provide diagrams, each illustrating a second example of arrangement of reference signals, according to the second aspect. As illustrated in FIG. 11A, even when the mapping field for short TTI UL data is constituted by the same frequency resource as that of the mapping field for long TTI UL data, separate reference signals may be arranged in the long TTI and the short TTI.

In the case illustrated in FIG. 11A, the radio base station may demodulate the long TTI UL data by using the first reference signal for the long TTI, and demodulate the short TTI UL data by using the second reference signal for the short TTI. In this case, different beam forming and/or rank control (control of the number of layers in space multiplexing) can be applied to the long TTI and the short TTI.

Figure 11B:
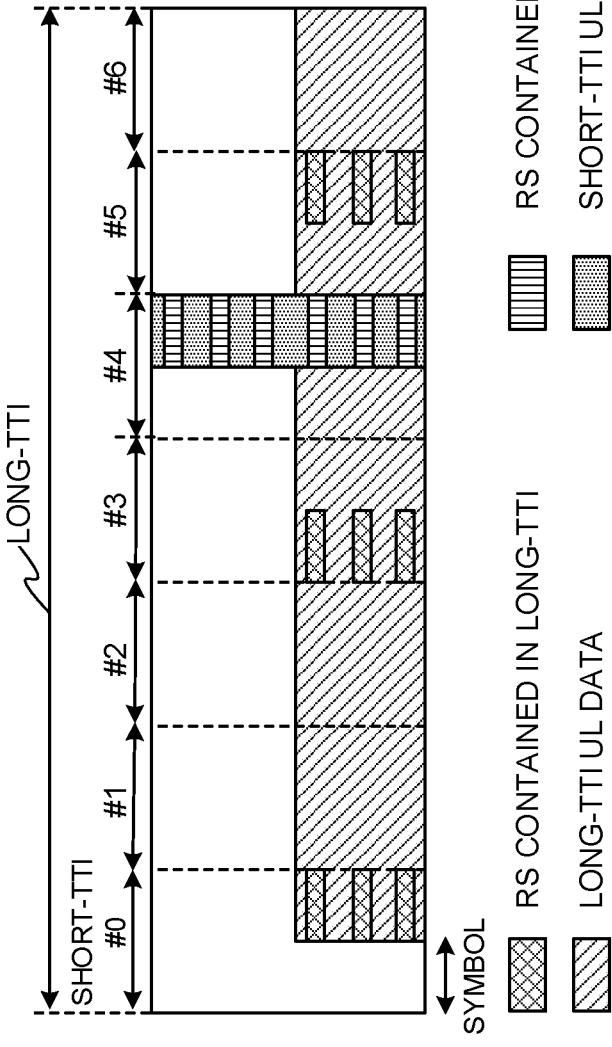

Likewise, as illustrated in FIG. 11B, when the mapping field for short TTI UL data is comprised of a resource that overlaps with the mapping field for long TTI UL data and a resource that does not overlap with the mapping field for long TTI UL data, reference signals for the short TTI may be arranged in both the overlapping resource and the non-overlapping resource.

Note that, although not illustrated, when a short TTI for performing DL communication is embedded in a long TTI for performing DL communication (including SL receipt), as illustrated in FIG. 11, the second reference signal is arranged in this short TTI.

Now, with reference to FIG. 12, the transmission process of long TTI UL data in the event data to address the same user terminal is allocated to a long TTI, which is for performing UL communication (including SL transmission), and a short TTI, which is for performing DL communication (including SL receipt) or UL communication (including SL transmission) will be described below. In the even a predetermined condition is fulfilled, the user terminal may cancel transmitting long TTI UL data. Note that the transmission process of long TTI data that will be described below can also be applied to the case where DL communication (including SL receipt) or UL communication (including SL transmission) takes place in short TTIs.

Figure 12:
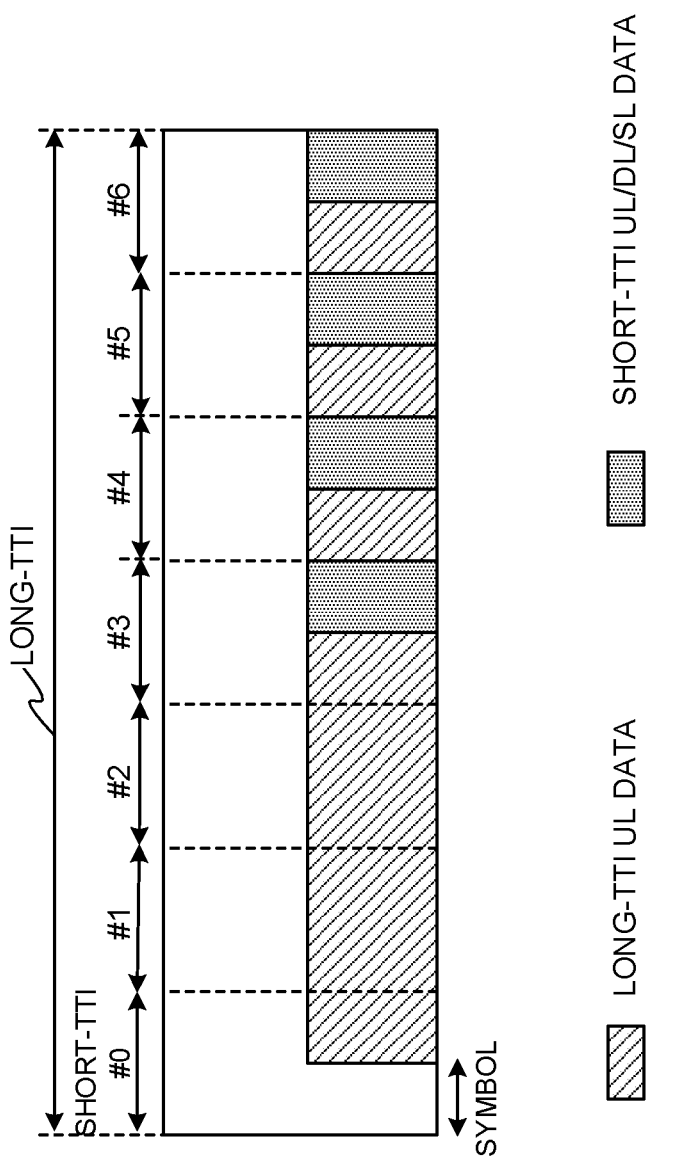
FIG. 12 is a diagram to explain the transmission process of long-TTI UL data, according to the second aspect.

FIG. 12 is a diagram to explain the transmission process for long TTI UL data according to the second aspect. FIG. 12 illustrates a case where short TTI data (including UL data, DL data and SL data) is allocated to each of short TTIs #3 to #6 in a long TTI. Note that, although not illustrated, when short TTI DL data (SL data for receipt) is allocated to short TTIs #3 to #6, a guard period may be provided between the mapping field for short TTI DL data and the mapping field for long TTI UL data.

As illustrated in FIG. 12, when short TTI data is allocated to more than a predetermined number of short TTIs in a long TTI, in a resource where the mapping field for short TTI data and the mapping field for long TTI UL data overlap, the long TTI UL data is punctured. In this case, even if this long TTI UL data is transmitted, there is a possibility that this long TTI DL data cannot be demodulated properly.

Therefore, if a predetermined condition is fulfilled, the user terminal does not have to demodulate the long TTI UL data. For example, if the effective coding rate of the long TTI UL data exceeds a predetermined value (for example, 0.931), the user terminal may stop transmitting this long TTI UL data. Here, the effective coding rate may be calculated based on, for example, the transport block size (TBS) and the total number of resource elements (REs) to which the long TTI data channel is allocated.

Also, when an interrupt occurs in more than a predetermined number of short TTIs, the user terminal may cancel transmitting long TTI UL data. Thus, the user terminal may decide whether or not to demodulate long TTI UL data based on various parameters such as the effective coding rate of long TTI UL data and/or the number of short TTIs where short TTI data is allocated.

Also, even when the user terminal cancels transmitting long TTI UL data based on the above predetermined conditions, the user terminal may anticipate retransmission control information (for example, HARQ (Hybrid Automatic Repeat reQuest)-ACK, ACK or NACK) in response to this long TTI UL data.

The user terminal may expect to receive a retransmission control channel (for example, PHICH (Physical Hybrid-ARQ Indicator Channel)) a predetermined period of time after long TTI UL data is transmitted. By this means, it is possible to prevent inconsistencies in the understanding of the codebook (HARQ-ACK codebook) for use for retransmission control, the format of UL control channels (PUCCH format) and so on, between the radio base station and the user terminal.

<Example of Embedding Short TTIs Addressed to Different User Terminals>

Now, with reference to FIG. 13, a case will be described here, in which data that is addressed to different user terminals is allocated to a long TTI, which is for performing UL communication (including SL transmission), and a short TTI, which is for performing DL communication (including SL receipt) or UL communication (including SL transmission). Below, differences from the case where data addressed to the same user terminal is allocated to a long TT for performing UL communication and a short TTI for performing DL communication or UL communication will be primarily described.

FIG. 13 is a diagram to illustrate an example of an interrupt by a short TTI addressed to a different user terminal, according to the second aspect. As illustrated in FIG. 13, in a long TTI for performing UL communication, a short TTI (here, short TTI #4), in which a different user terminal from that of the long TTI performs UL communication or DL communication, may be embedded. Note that, when DL communication is assigned in short TTI #4, a guard period may be provided between DL data for the short TTI and UL data for the long TTI.

Figure 13A:
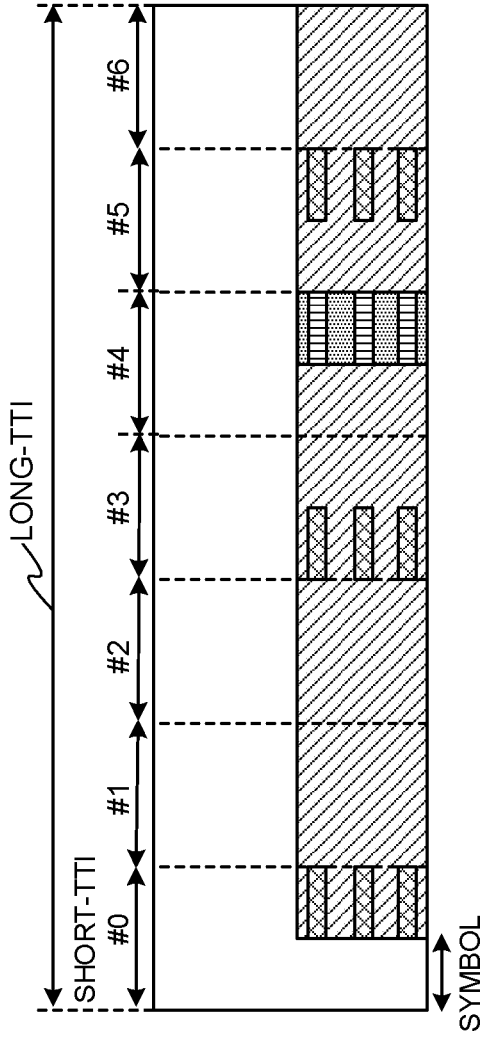
FIGS. 13A and 13B are diagrams, each illustrating another example of an interrupt by a short TTI, according to the second aspect.
Figure 13B:
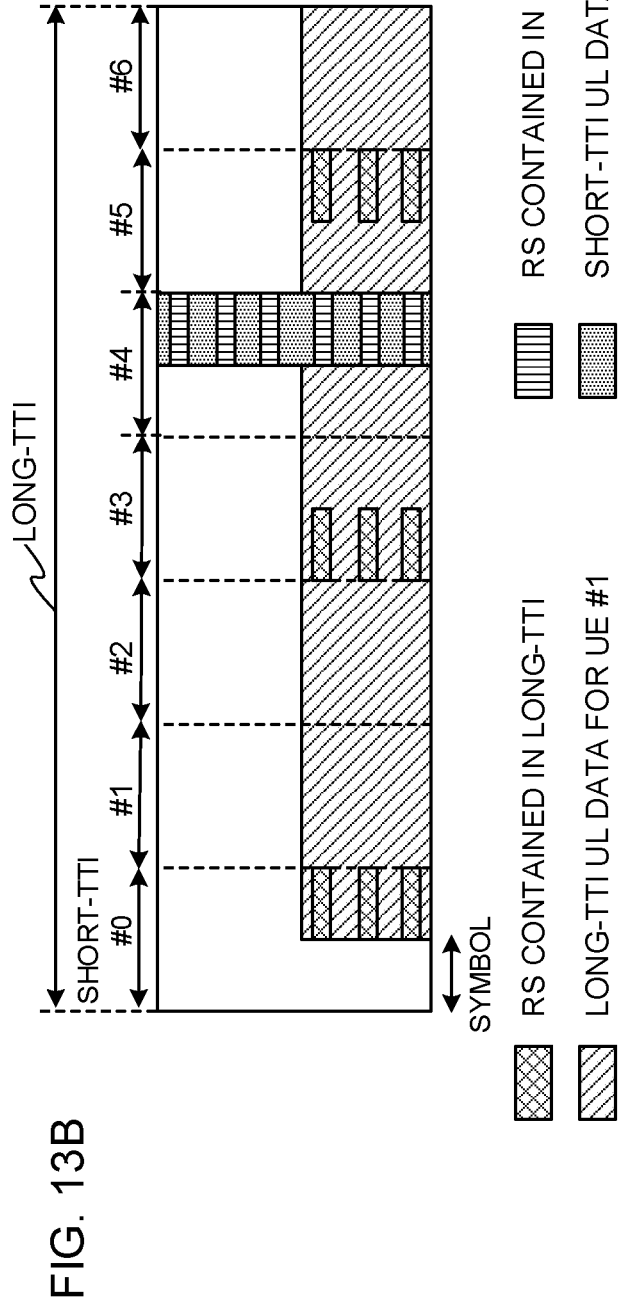

FIGS. 13A and 13B illustrate cases where long TTI UL data is allocated to user terminal #1, and where, in short TTI #5, short TTI UL data is allocated to user terminal #2. In FIGS. 13A and 13B, user terminals #1 and #2 need not be capable of transmitting long TTI DL data and short TTI UL data in parallel (simultaneously).

Furthermore, information regarding transmission of long TTI UL data and short TTI UL data may be configured in advance, for each of user terminals #1 and #2, by higher layer signaling. To be more specific, the TTI duration to use in DL and/or UL communication can be configured by user terminal-specific higher layer signaling. In this case, the user terminals can operate to use the configured TTI duration semi-statically (that is, the user terminal does not switch the configured TTI duration dynamically, in units of time such as subframes). For example, in the example of FIG. 13, user terminal #1 communicates only in the long TTI, and user terminal #2 communicates only in the short TTI.

When long TTI UL data and the short TTI UL data in short TTI #4 are allocated to different user terminals, regardless of whether the mapping field for short TTI data partially or completely overlaps (is included in) the mapping field for long TTI DL data, as illustrated in FIGS. 13A and 13B, separate reference signals may be arranged in the long TTI and the short TTI. The same is true when short TTI DL data is allocated in short TTI #4.

In FIGS. 13A and 13B, the radio base station demodulates the long TTI UL data from user terminal #1 by using the first reference signal for the long TTI. On the other hand, the radio base station demodulates the short TTI UL data from user terminal #2 by using the second reference signal for the short TTI allocated to short TTI #4.

(Other Aspects)

In the event the same user terminal performs UL communication (including SL transmission) in both a long TTI and a short TTI, the logical channel and/or the bearer type that can be transmitted in the short TTI may be limited. In existing LTE systems, the user terminal transmits data in order from the buffer of the highest priority, the data to be transmitted in a short TTI may be transmitted in a long TTI.

So, the user terminal may select either a short TTI or a long TTI, depending on the logical channel and/or the bearer type, and transmit data. Note that the logical channel and/or the bearer type of data transmitted in a short TTI may be determined in advance, or configured in the user terminal by system information or by higher layer signaling.

For example, by configuring a logical channel and/or a bearer type of high priority (the requirement for latency reduction is strict) in a short TTI, it is possible to prevent data of this logical channel and/or bearer type from being allocated to a long TTI.

Also, when there is a possibility that a short TTI may be embedded in (interrupts) a long TTI, a user terminal that performs UL communication in this long TTI may transmit long TTI UL data in a specific format. This specific format may, for example, divide the information bits of long TTI UL data into multiple divisions, so that the divisions of data may be time-division-multiplexed in the long TTI and transmitted. As a result of this, when an interrupt by a short TTI occurs in the middle of the long TTI, part of the divisions of data may be punctured, but the rest of the divisions of data are not punctured. Therefore, it is possible to ensure the quality of long TTI UL data.

Similarly, if there is a possibility that a short TTI may be embedded in a long TTI where DL communication takes place, long TTI DL data may be transmitted in a specific format. This specific format may, for example, divide the information bits of long TTI DL data into multiple divisions, so that the divisions of data may be time-division-multiplexed in the long TTI and transmitted.

(Radio Communication System)

Now, the structure of a radio communication system according to the present embodiment will be described below. In this radio communication system, each radio communication method according to the above-described embodiments is employed. Note that the radio communication method according to each embodiment may be used alone or may be used in combination.

Figure 14:
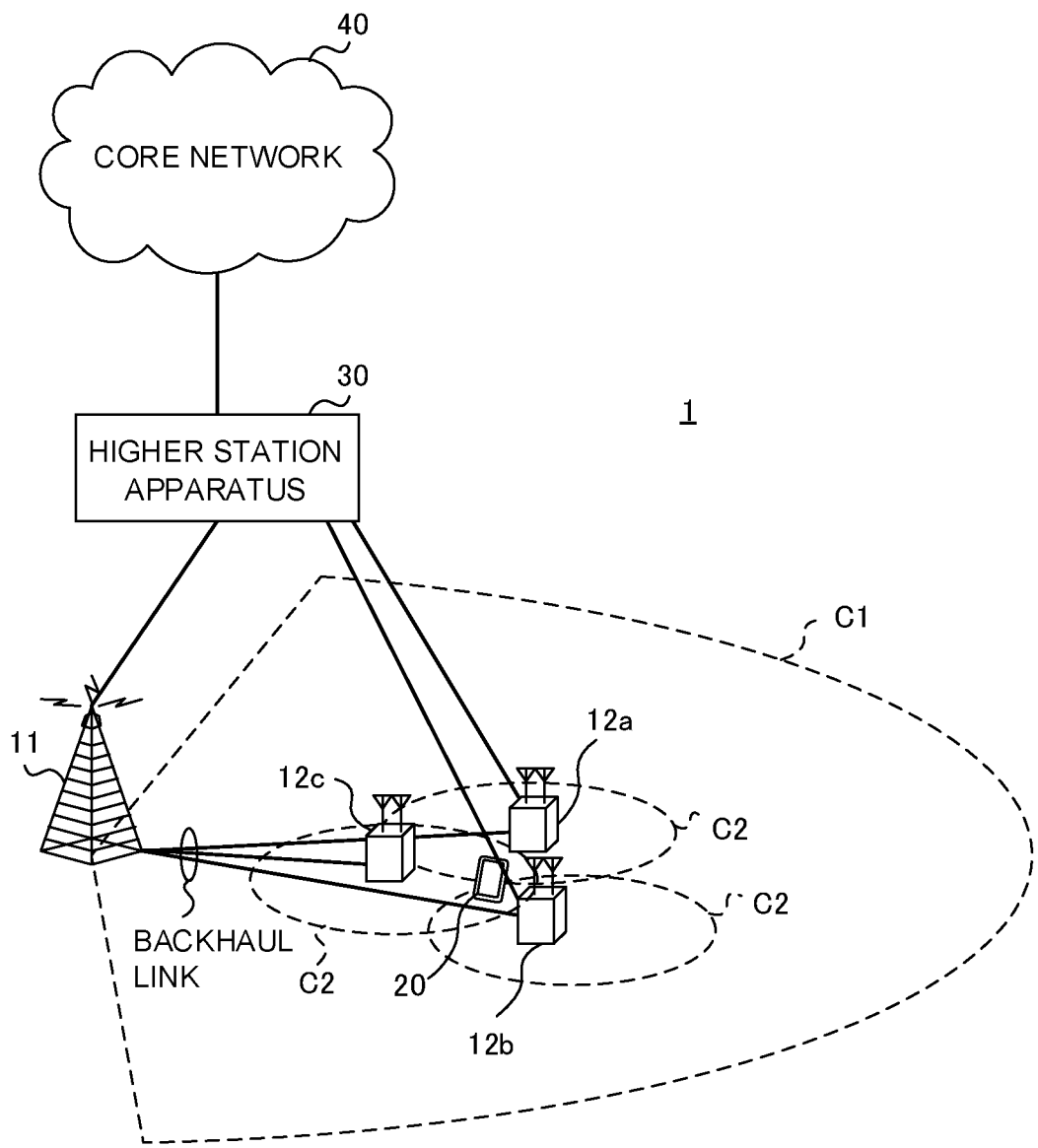
FIG. 14 is a diagram to illustrate an example of a schematic structure of a radio communication system according to the present embodiment.

FIG. 14 is a diagram to illustrate an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A (LTE-Advanced)," "IMT-Advanced," "4G," "5G," "FRA (Future Radio Access)," "NR (New RAT)" and so on.

The radio communication system 1 illustrated in FIG. 14 includes a radio base station 11 that forms a macro cell C1, and radio base stations 12a and 12b that form small cells C2, which are placed within the macro cell C1 and which are narrower than the macro cell C1. Also, user terminals 20 are placed in the macro cell C1 and in each small cell C2. A configuration in which different numerologies are applied between cells may be adopted. Note that a "numerology" refers to a set of communication parameters that characterize the design of signals in a given RAT and the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), either long TTIs or short TTIs may be used, or both long TTIs and short TTIs may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

Furthermore, the user terminals 20 can perform inter-terminal (D2D) communication with other user terminals 20.

In the radio communication system 1, as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL. Also, SC-FDMA can be applied to side links (SLs) used in inter-terminal communication.

In the radio communication system 1, DL data channel (PDSCH (Physical Downlink Shared CHannel), which is also referred to as, for example, a "DL shared channel"), which is used by each user terminal 20 on a shared basis, a broadcast channel (PBCH (Physical Broadcast CHannel)), L1/L2 control channels and so on, are used as DL channels. User data, higher layer control information and SIBs (System Information Blocks) are communicated in the PDSCH. Also, the MIB (Master Information Blocks) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, UL data channel (PUSCH (Physical Uplink Shared CHannel), which is also referred to as "UL shared channel" and so on), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of retransmission command information (ACK/NACK), channel state information (CSI) and so on, is communicated in the PUSCH or the PUCCH. By means of the PRACH, random access preambles for establishing connections with cells are communicated.

In the radio communication system 1, an SL data channel for communicating SL data (which is, for example, PSSCH (Physical Sidelink Shared CHannel), and which is also referred to as "SL shared channel" and/or the like), an SL control channel (which is, for example, PSCCH (Physical Sidelink Control CHannel)) and others are used as SL channels.

(Radio Base Station)

Figure 15:
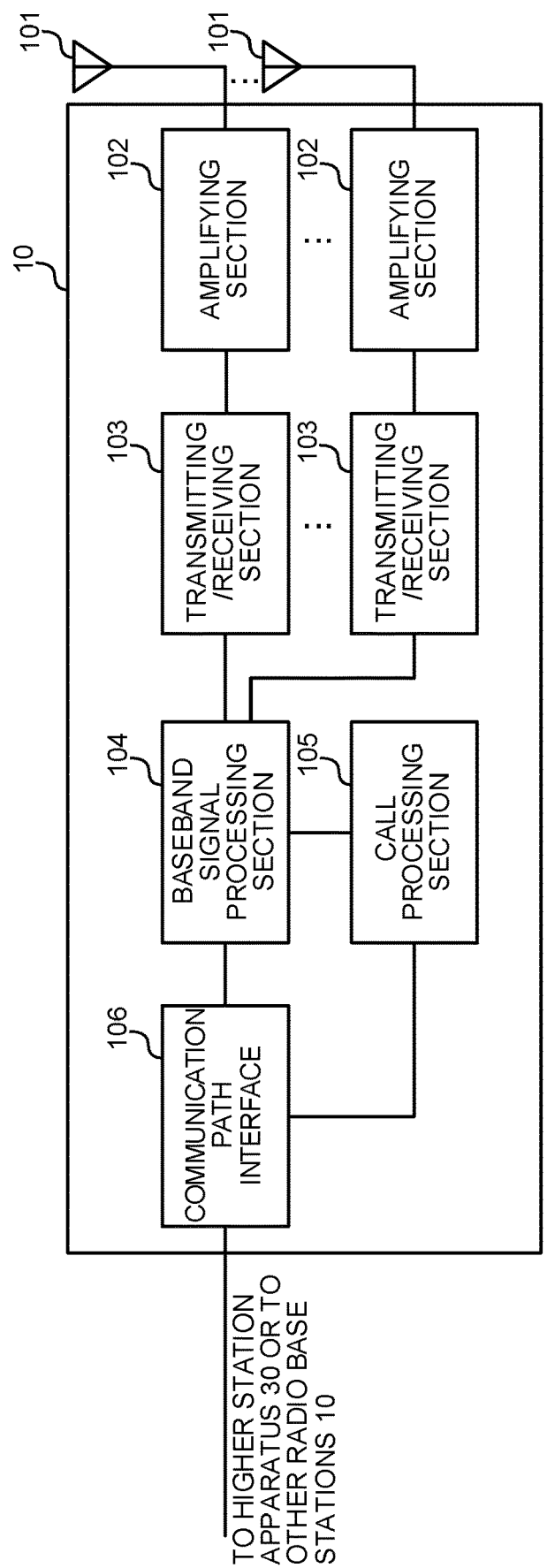
FIG. 15 is a diagram to illustrate an example of an overall structure of a radio base station according to the present embodiment.

FIG. 15 is a diagram to illustrate an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to the transmission process, including a PDCP (Packet Data Convergence Protocol) layer process, division and coupling of the user data, RLC (Radio Link Control) layer transmission process such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving sections 103. Furthermore, downlink control signals are also subjected to transmission process such as channel coding and an inverse fast Fourier transform, and forwarded to the transmitting/receiving sections 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit DL signals (for example, scheduling information, DL data, UL retransmission control information, etc.), and receive UL signals (for example, UL data, DL retransmission control information, etc.) in a long TTI (first TTI) and/or in a short TTI (second TTI).

Figure 16:
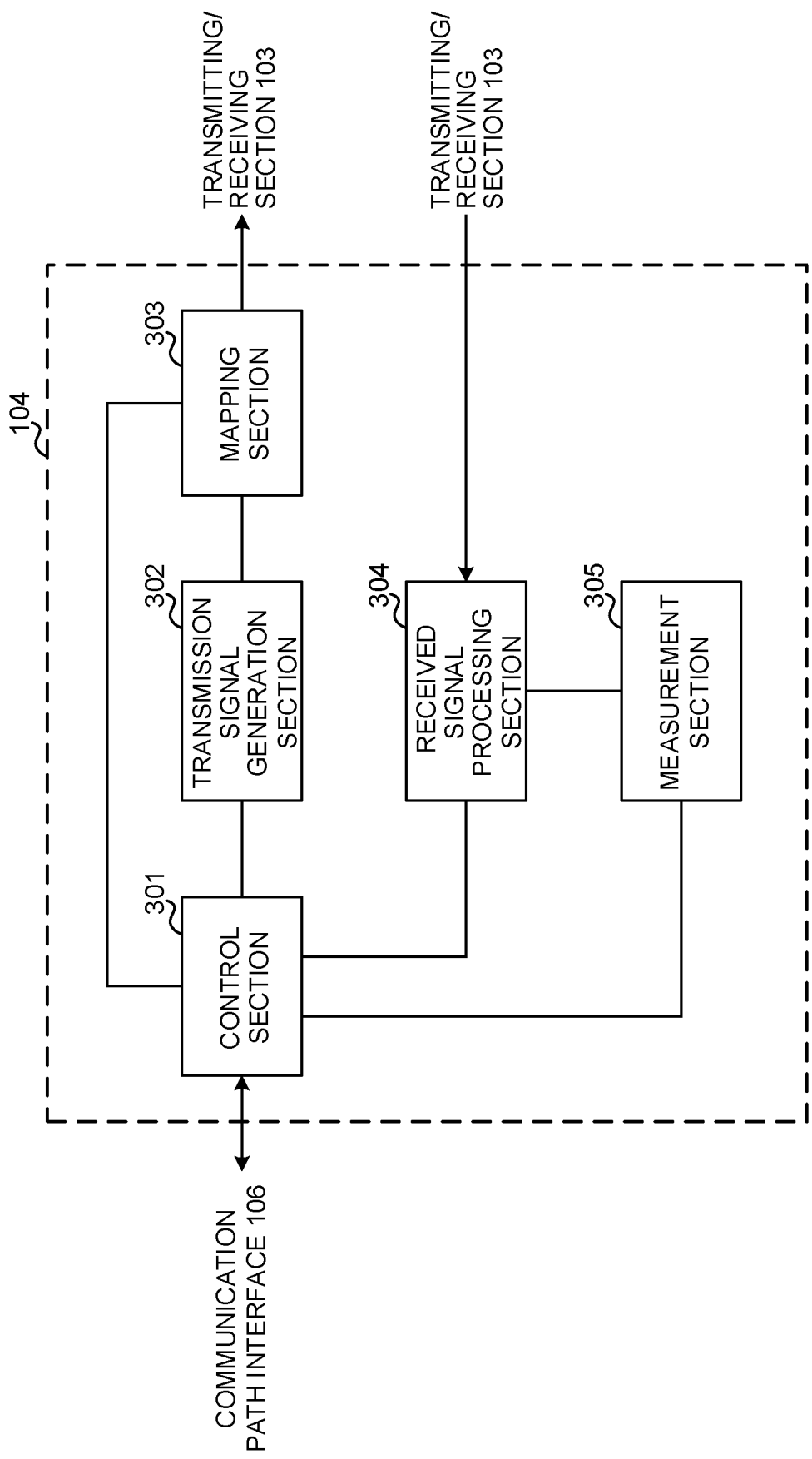
FIG. 16 is a diagram to illustrate an example of a functional structure of a radio base station according to the present embodiment.

FIG. 16 is a diagram to illustrate an example of a functional structure of a radio base station according to the present embodiment. Note that, although FIG. 16 primarily illustrates functional blocks that pertain to characteristic parts of the present embodiment, the radio base station 10 has other functional blocks that are necessary for radio communication as well. As illustrated in FIG. 16, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving process (for example, demodulation) for UL signals by the received signal processing section 304 and the measurements by the measurement section 305.

In particular, the control section 301 schedules long TTIs and/or short TTIs. For example, the control section 301 may control scheduling (data allocation) in long TTIs and/or short TTIs depending on the logical channel, and/or the bearer type. The control section 301 may control the transmission process (for example, encoding, modulation, transmission, etc.) of scheduling information using a scheduling control channel in long TTIs and/or short TTIs.

Also, the control section 301 controls the transmission of DL signals and/or receipt of UL signals in long TTIs and/or short TTIs. To be more specific, the control section 301 may control the DL data transmission process (for example, encoding, modulation, mapping, transmission, etc.) and/or the UL data receiving process (for example, receipt, demapping, demodulation, decoding, etc.) in long TTIs and/or short TTIs.

For example, when a resource is inserted in the middle of DL data for a short TTI and/or a scheduling control channel for the short TTI, the control section 301 may puncture the DL data for the long TTI. In addition, in a long TTI where an interrupt by a short TTI may occur, the control section 301 may divide the information bits of DL data into a plurality of divisions, and time-division-multiplex the divisions of data in the long TTI.

Also, when a predetermined condition is fulfilled, the control section 301 may cancel the transmission process for long TTI DL data and/or the receiving process for long TTI UL data (FIG. 7 and FIG. 13). Here, the predetermined condition may be, for example, that the effective coding rate exceeds a predetermined value (for example, 0.931), or that the number of short TTIs to which short TTI data (DL data or UL data) is allocated in the long TTI exceeds a predetermined value, and/or others.

Furthermore, the control section 301 controls the process of generating and transmitting retransmission control information (HARQ-ACK) in response to long TTI UL data. For example, the control section 301 may exert control so that, even when the receiving process of long TTI UL data is canceled, this retransmission control information (for example, NACK) in response to the long TTI UL data is transmitted.

Also, the control section 301 may control the process (for example, encoding, modulation, mapping, transmission, etc.) of generating and transmitting a first reference signal for a long TTI and/or a second reference signal for a short TTI. For example, when DL data that is addressed to the same user terminal is allocated to a long TTI and a short TTI, the control section 301 may skip arranging second reference signals in resources where the long TTI and the short TTI overlap, and arrange second reference signals only in non-overlapping resources (FIG. 5). Alternatively, regardless of whether the long TTI and the short TTI overlap in resources, the control section 301 may arrange second reference signals in resources where the short TTI is allocated (FIG. 6 and FIG. 8).

The control section 301 can be constituted by a controller, a control circuit or control apparatus that can be described based on general understanding of the technical field to which the present invention pertains.

The transmission signal generation section 302 generates DL signals (including DL data, scheduling information, first and second reference signals, etc.) based on commands from the control section 301, and outputs these to the mapping section 303.

For the transmission signal generation section 302, a signal generator, a signal generation circuit or signal generation apparatus that can be described based on general understanding of the technical field to which the present invention pertains can be used.

The mapping section 303 maps the DL signals generated in the transmission signal generation section 302 to predetermined radio resources based on commands from the control section 301, and outputs these to the transmitting/receiving sections 103. For the mapping section 303, mapper, a mapping circuit or mapping apparatus that can be described based on general understanding of the technical field to which the present invention pertains can be used.

The received signal processing section 304 performs the receiving process (for example, demapping, demodulation, decoding and so on) of uplink signals that are transmitted from the user terminals 20. To be more specific, the received signal processing section 304 demodulates UL data for long TTIs using the first reference signal. In addition, the received signal processing section 304 may demodulate UL data for short TTIs using the first reference signal and/or the second reference signal.

To be more specific, the received signal processing section 304 may output the received signals, the signals after the receiving process and so on, to the measurement section 305. The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the received power (for example, the RSRP (Reference Signal Received Power)), the received quality (for example, RSRQ (Reference Signal Received Quality)), channel states and so on of the received signals. The measurement results may be output to the control section 301.

(User Terminal)

Figure 17:
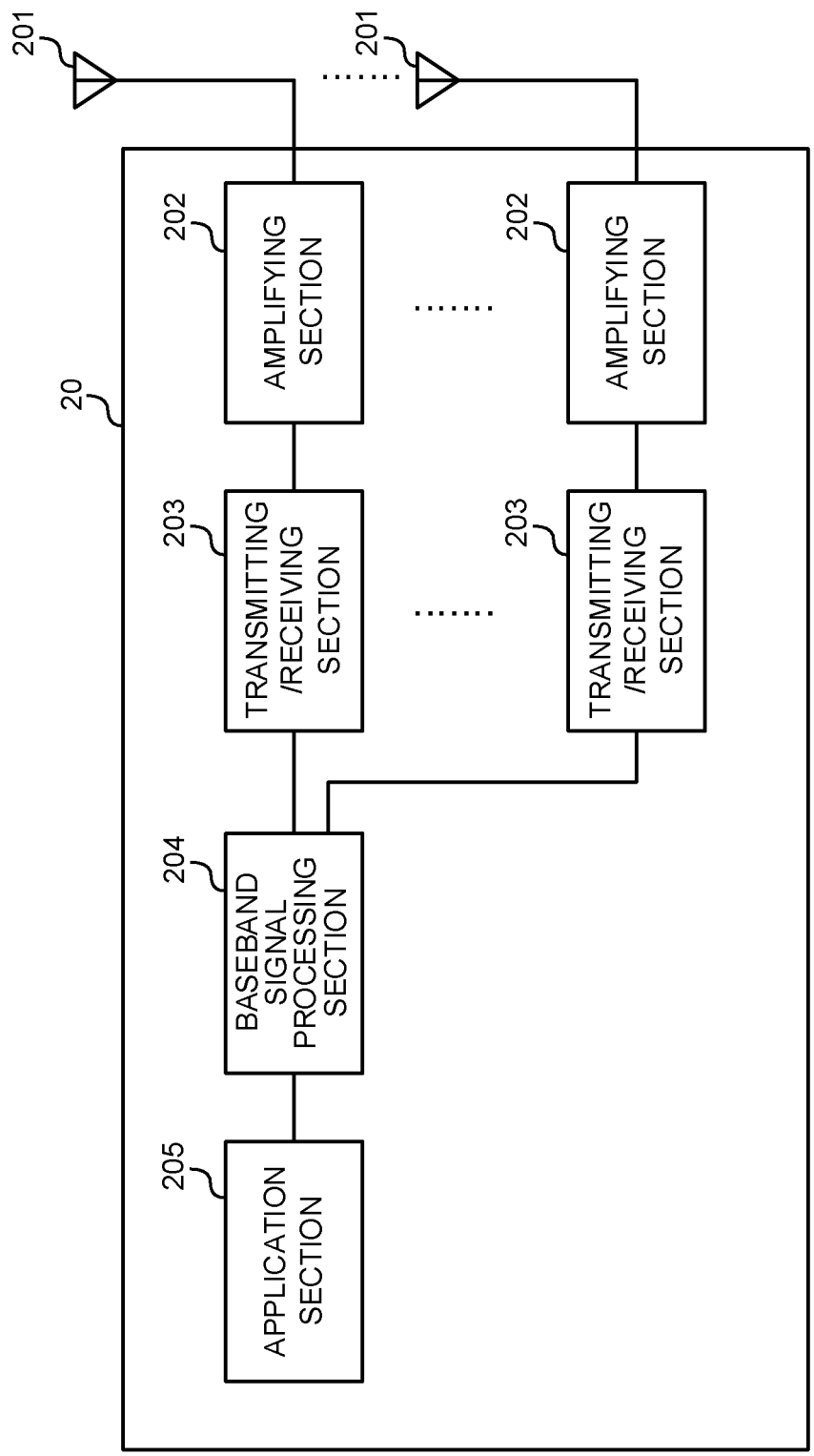
FIG. 17 is a diagram to illustrate an example of an overall structure of a user terminal according to the present embodiment.

FIG. 17 is a diagram to illustrate an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. DL (SL) data is forwarded to the application section 205. The application section 205 performs processes related to higher layers above the physical layer and the MAC layer, and so on. Furthermore, in the downlink data, broadcast information is also forwarded to the application section 205.

Meanwhile, UL (SL) data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to each transmitting/receiving section 203. UCI (for example, DL retransmission control information, channel state information, etc.) is also subjected to channel encoding, rate matching, puncturing, DFT process, IFFT process, etc., and transferred to each transmitting/receiving section 203.

The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Also, the transmitting/receiving sections 203 receive DL signals (for example, scheduling information, DL data and UL retransmission control information) and/or SL signals (for example, SL data) in long TTIs (first TTIs) and/or short TTIs (second TTIs). In addition, the transmitting/receiving sections 203 transmit UL signals (for example, UL data and DL retransmission control information) and/or SL signals (for example, SL data) in long TTIs and/or short TTIs.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, or may be formed with a transmitting section and a receiving section.

Figure 18:
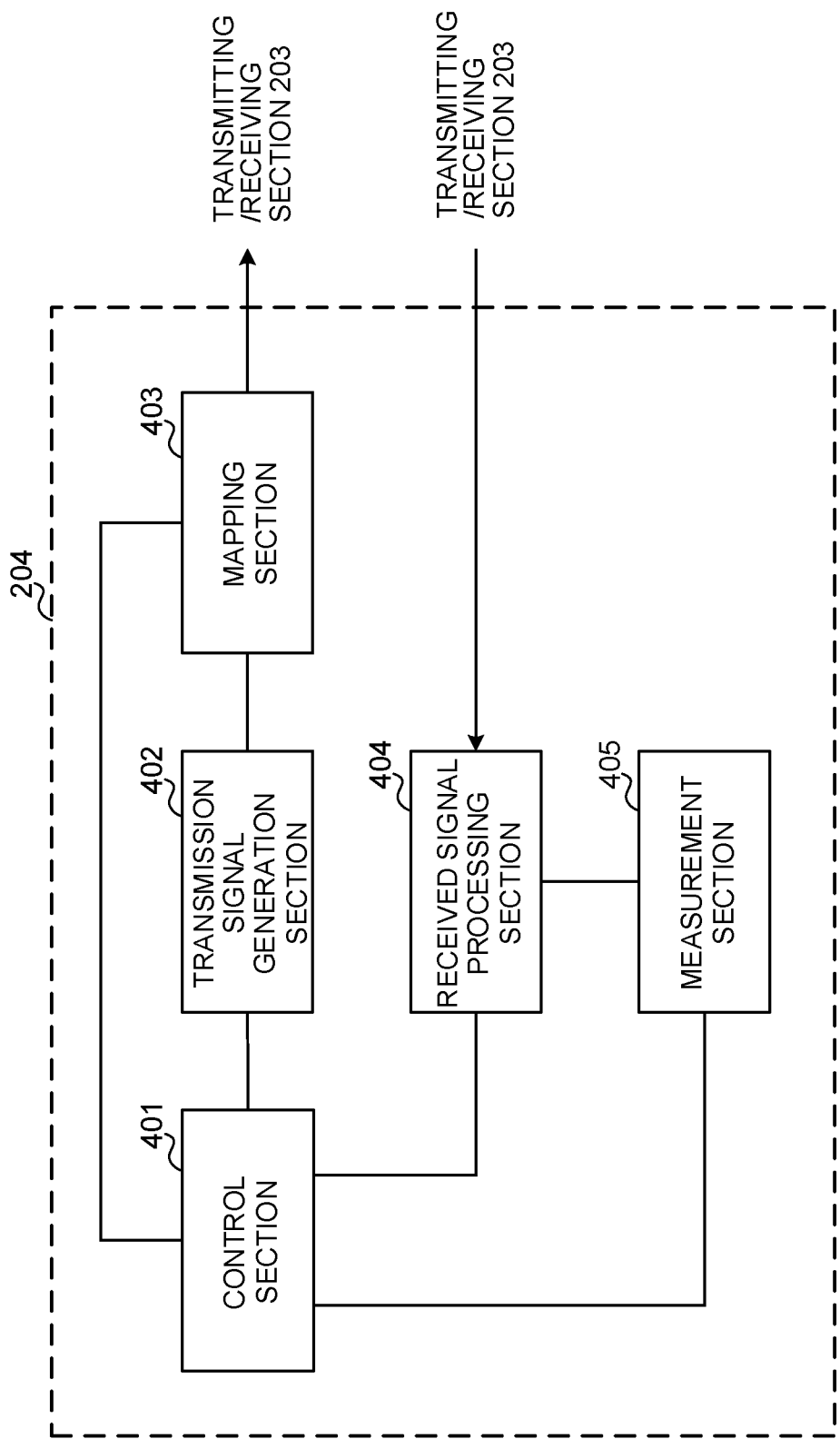
FIG. 18 is a diagram to illustrate an example of a functional structure of a user terminal according to the present embodiment.

FIG. 18 is a diagram to illustrate an example of a functional structure of a user terminal according to the present embodiment. Note that, although FIG. 18 primarily illustrates functional blocks that pertain to characteristic parts of the present embodiment, the user terminal 20 has other functional blocks that are necessary for radio communication as well. As illustrated in FIG. 18, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL (SL) signals in the transmission signal generation section 402, the mapping of UL (SL) signals in the mapping section 403, the UL (SL) signal receiving process in the received signal processing section 404, the measurements in the measurement section 405 and so on.

To be more specific, the control section 401 may monitor (blind-decode) the scheduling control channels for long TTIs and/or short TTIs, and detect scheduling information pertaining to long TTIs and/or short TTIs for the user terminal 20.

In addition, the control section 401 controls receipt of DL (SL) signals and/or transmission of UL (SL) signals in long TTIs and/or short TTIs. To be more specific, the control section 401 may control the receiving process of DL (SL) data (for example, receipt, demapping, demodulation, decoding, etc.) and/or the transmission process of UL (SL) data (for example, encoding, modulation, mapping, transmission, etc.) in long TTIs and/or short TTIs.

For example, when UL data addressed to the same user terminal is allocated to a long TTI and a short TTI, the control section 401 may exert control so that DL (SL) data for the short TTI is demodulated by using the first reference signal in a resource where the long TTI and the short TTI overlap, and DL (SL) data for the short TTI is demodulated by using the second reference signal in a non-overlapping resource (FIG. 5). Alternatively, the control section 401 may exert control so that, regardless of whether or not the long TTI and the short TTI overlap in a resource, DL (SL) data for the short TTI is demodulated by using the second reference signal (FIG. 6).

Furthermore, the control section 401 may puncture UL (SL) data for the long TTI in a resource interrupted by UL data for the short TTI. In addition, in a long TTI where an interrupt by a short TTI may occur, the control section 301 may divide the information bits of UL data into a plurality of divisions and time-division-multiplex the divisions of data in the long TTI.

Also, when a predetermined condition is fulfilled, the control section 401 may cancel the receiving process for long TTI DL data and/or the transmission process for long TTI UL data (FIG. 7 and FIG. 13). The predetermined condition is, for example, that the effective coding rate exceeds predetermined value (for example, 0.931), that the number of short TTIs to which short TTI data (DL data or UL data) is allocated in a long TTI exceeds a predetermined value, and so on.

In addition, the control section 401 controls the generation and transmission process of retransmission control information (HARQ-ACK) related to the DL data for long TTI. For example, the control section 401 may exert control so that retransmission control information (for example, NACK) in response to long TTI DL data is transmitted even when the receiving process of long TTI DL data is canceled.

Also, the control section 401 may control the generation and transmission processes (for example, encoding, modulation, mapping, transmission, etc.) of a first reference signal for a long TTI and/or a second reference signal for a short TTI. For example, when UL data addressed to the same user terminal is allocated to a long TTI and a short TTI, the control section 401 may skip arranging the second reference signal in a resource where the long TTI and the short TTI overlap, and arrange the second reference signal in a non-overlapping resource (FIG. 10). Alternatively, regardless of whether the long TTI and the short TTI overlap in a resource, the control section 401 may arrange the second reference signal in the resource to which the short TTI is allocated (FIG. 11 and FIG. 13).

For the control section 401, a controller, a control circuit or control apparatus that can be described based on general understanding of the technical field to which the present invention pertains can be used.

In the transmission signal generation section 402, UL (SL) signals (including UL (SL) data, and the first and second reference signals) are generated (including, for example, coding, rate matching, puncturing, modulation, and so on) based on commands from the control section 401, and output to the mapping section 403. For the transmission signal generation section 402, a signal generator, a signal generation circuit or signal generation apparatus that can be described based on general understanding of the technical field to which the present invention pertains can be used.

The mapping section 403 maps the UL (SL) signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs the receiving process (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information that is provided via higher layer signaling such as RRC signaling, L1/L2 control information (for example, scheduling information) and so on, to the control section 401.

The received signal processing section 404 can be constituted by a signal processor, a signal processing circuit or a signal processing device that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC. Measurement section 405 may also perform channel estimation using the first and second reference signals and output the estimated results to the control section 401.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 19:
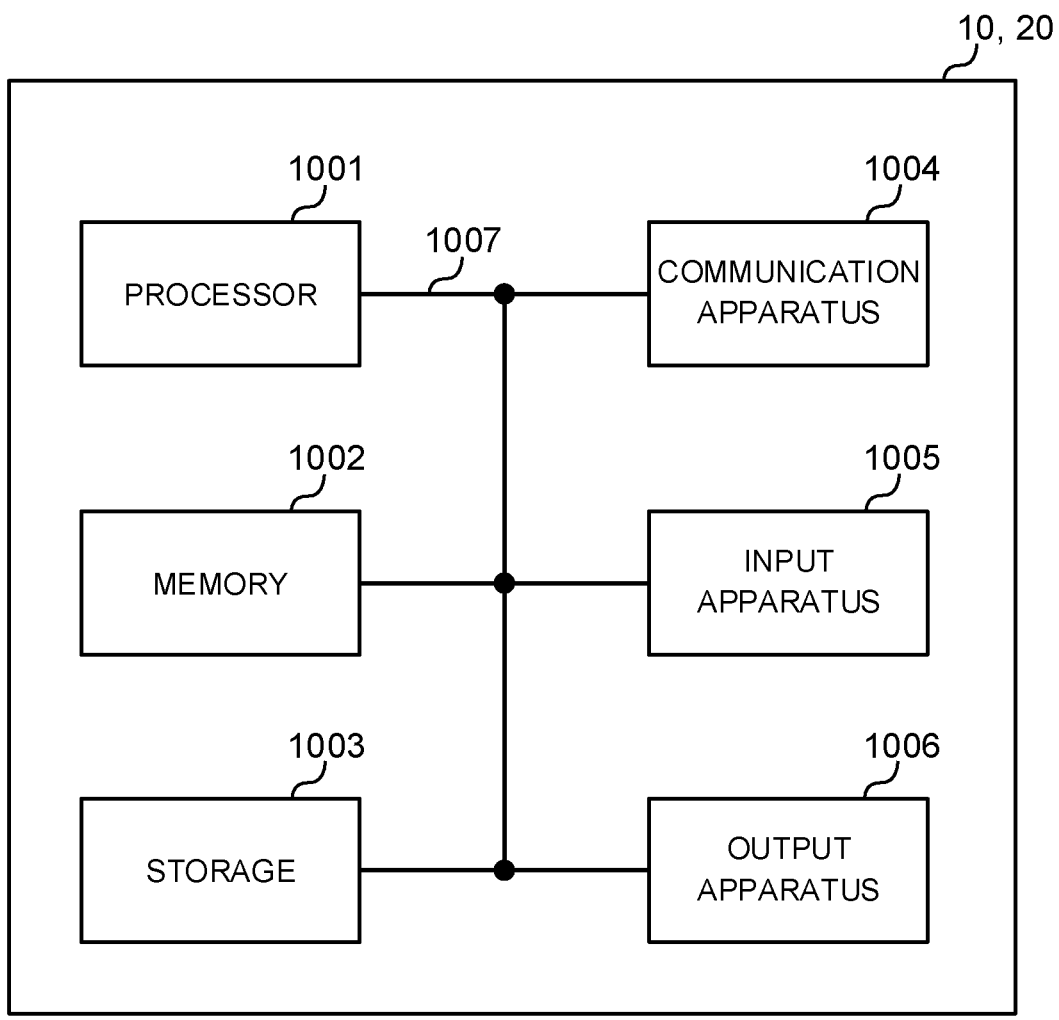
FIG. 19 is a diagram to illustrate an example hardware structure of a radio base station and a user terminal according to the present embodiment.

That is, a radio base station, a user terminal and so on according to an embodiment of the present invention may function as a computer that executes the processes of the radio communication method of the present invention. FIG. 19 is a diagram to illustrate an example of a hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus illustrated in the drawings, or may be designed not to include part of the apparatus.

For example, although only one processor 1001 is illustrated, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by allowing predetermined software (programs) to be read on hardware such as the processor 1001 and the memory 1002, and by allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these types of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frames, a subframe, a slot and a symbol may be each called by other applicable names. For example, one subframe may be referred to as a "transmission time interval" (TTI), or a plurality of consecutive subframes may be referred to as a "TTI," or one slot may be referred to as a "TTI." That is, a subframe and a TTI may be a subframe (1 ms) in existing LTE, may be a shorter period than 1 ms (for example, one to thirteen symbols), or may be a longer period of time than 1 ms.

Here, a TTI refers to the minimum time unit of scheduling in radio communication, for example. For example, in LTE systems, a radio base station schedules the allocation of radio resources (such as the frequency bandwidth and transmission power that can be used by each user terminal) for each user terminal in TTI units. Note that the definition of TTIs is not limited to this. TTIs may be transmission time units for channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," or the like.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," or the like.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency regions, microwave regions and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-094760, filed on May 10, 2016, including the specification, drawings and abstract, is incorporated herein by reference in its entirety.

The invention claimed is:

1. A terminal comprising:
a receiver that receives scheduling information pertaining to a second downlink shared channel or a second uplink shared channel in a second Transmission Time Interval that overlaps a first downlink shared channel or a first uplink shared channel in a first Transmission Time Interval, the second Transmission Time Interval being shorter than the first Transmission Time Interval; and
a processor that controls, based on the scheduling information, at least one of reception of the second downlink shared channel and transmission of the second uplink shared channel,
wherein, when reception of the first downlink shared channel and reception of the second downlink shared channel are assigned to the terminal, the processor demodulates the second downlink shared channel using a reference signal, which is arranged within the first Transmission Time Interval, and when transmission of the first uplink shared channel and transmission of the second uplink shared channel are assigned to the terminal, the processor arranges a reference signal for demodulating the second uplink shared channel within the second Transmission Time Interval.

2. The terminal according to claim 1, wherein the processor cancels at least one of reception and transmission of a data in the first Transmission Time Interval when a condition is fulfilled.

3. A radio communication method for a terminal, comprising:
receiving scheduling information pertaining to a second downlink shared channel or a second uplink shared channel in a second Transmission Time Interval that overlaps a first downlink shared channel or a first uplink shared channel in a first Transmission Time Interval, the second Transmission Time Interval being shorter than the first Transmission Time Interval; and
controlling, based on the scheduling information, at least one of reception of the second downlink shared channel and transmission of the second uplink shared channel,
wherein, when reception of the first downlink shared channel and reception of the second downlink shared channel are assigned to the terminal, a processor demodulates the second downlink shared channel by using a reference signal, which is arranged within the first Transmission Time Interval, and when transmission of the first uplink shared channel and transmission of the second uplink shared channel are assigned to the terminal, the processor arranges a reference signal for demodulating the second uplink shared channel within the second Transmission Time Interval.

4. A base station comprising:
a transmitter that transmits scheduling information, for controlling at least one of reception of a second downlink shared channel or transmission of a second uplink shared channel in a second Transmission Time Interval, pertaining to the second downlink shared channel or the second uplink shared channel in the second Transmission Time Interval that overlaps a first downlink shared channel or a first uplink shared channel in a first Transmission Time Interval, the second Transmission Time Interval being shorter than the first Transmission Time Interval; and
when reception of the first downlink shared channel and reception of the second downlink shared channel are assigned to a terminal, a processor that controls to arrange a reference signal within the first Transmission Time Interval, and when transmission of the first uplink shared channel and transmission of the second uplink shared channel are assigned to the terminal, the processor that controls to demodulate the second uplink shared channel by using a reference signal, which is arranged within the second Transmission Time Interval.

* * * * *